(12) United States Patent
Fu et al.

(10) Patent No.: US 10,275,070 B2
(45) Date of Patent: Apr. 30, 2019

(54) TIME SHARING OF DISPLAY AND SENSING DATA

(71) Applicant: SYNAPTICS INCORPORATED, San Jose, CA (US)

(72) Inventors: Chih-Hong Fu, San Jose, CA (US); Joseph Kurth Reynolds, Alviso, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 563 days.

(21) Appl. No.: 14/987,558

(22) Filed: Jan. 4, 2016

(65) Prior Publication Data

US 2016/0195988 A1 Jul. 7, 2016

Related U.S. Application Data

(60) Provisional application No. 62/100,056, filed on Jan. 5, 2015.

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
None
See application file for complete search history.

(56) References Cited

U.S. PATENT DOCUMENTS

| | | |
|---|---|---|
| 5,093,655 A | 3/1992 | Tanioka et al. |
| 5,392,058 A | 2/1995 | Tagawa |
| 5,534,892 A | 7/1996 | Tagawa |
| 5,896,120 A | 4/1999 | Iguchi et al. |
| 6,219,113 B1 | 4/2001 | Takahara |
| 6,239,788 B1 | 5/2001 | Nohno et al. |
| 6,560,276 B1 | 5/2003 | Long et al. |
| 7,031,886 B1 | 4/2006 | Hargreaves |
| 7,451,050 B2 | 11/2008 | Hargreaves |
| 7,633,566 B2 | 12/2009 | Utsunomiya et al. |
| 8,243,027 B2 | 8/2012 | Hotelling et al. |
| 8,743,300 B2 | 6/2014 | Chang et al. |
| 2004/0095336 A1 | 5/2004 | Hong et al. |
| 2004/0217945 A1 | 11/2004 | Miyamoto et al. |
| 2005/0135492 A1 | 6/2005 | Jia et al. |
| 2006/0012575 A1 | 1/2006 | Knapp et al. |
| 2006/0114247 A1 | 6/2006 | Brown |

(Continued)

FOREIGN PATENT DOCUMENTS

| | | |
|---|---|---|
| CN | 1940842 A | 4/2007 |
| CN | 101051256 A | 10/2007 |

(Continued)

OTHER PUBLICATIONS

International Search Report and Written Opinion dated Dec. 26, 2013 for Application No. PCT/US2013/057990.

(Continued)

*Primary Examiner* — Carl Adams
(74) *Attorney, Agent, or Firm* — Patterson + Sheridan, LLP

(57) ABSTRACT

This disclosure generally provides input devices, processing systems and methods for touch sensing that maintain substantially equal capacitive sensing frame reporting rates when operated at different display refresh rates.

28 Claims, 10 Drawing Sheets

(56) References Cited

U.S. PATENT DOCUMENTS

| | | |
|---|---|---|
| 2006/0214918 A1 | 9/2006 | Destura et al. |
| 2006/0236029 A1 | 10/2006 | Corrado et al. |
| 2007/0026966 A1 | 2/2007 | Sanchez |
| 2007/0074914 A1 | 4/2007 | Geaghan et al. |
| 2007/0262966 A1 | 11/2007 | Nishimura et al. |
| 2008/0018581 A1 | 1/2008 | Park et al. |
| 2008/0018612 A1 | 1/2008 | Nakamura et al. |
| 2008/0048989 A1 | 2/2008 | Yoon et al. |
| 2008/0055267 A1 | 3/2008 | Wu et al. |
| 2008/0062139 A1 | 3/2008 | Hotelling et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0104655 A1 | 5/2008 | Hayward |
| 2008/0144743 A1 | 6/2008 | Alderson et al. |
| 2008/0150901 A1 | 6/2008 | Lowles et al. |
| 2008/0180407 A1 | 7/2008 | Utsunomiya et al. |
| 2008/0238867 A1 | 10/2008 | Maeda et al. |
| 2008/0309625 A1 | 12/2008 | Krah et al. |
| 2008/0309627 A1 | 12/2008 | Hotelling et al. |
| 2008/0309628 A1 | 12/2008 | Krah et al. |
| 2009/0009194 A1 | 1/2009 | Seguine |
| 2009/0046205 A1 | 2/2009 | Strasser et al. |
| 2009/0079707 A1 | 3/2009 | Kaehler et al. |
| 2009/0160461 A1 | 6/2009 | Zangl et al. |
| 2009/0189867 A1 | 7/2009 | Krah et al. |
| 2009/0195511 A1 | 8/2009 | Cites et al. |
| 2009/0213042 A1 | 8/2009 | Hagino et al. |
| 2009/0256818 A1 | 10/2009 | Noguchi et al. |
| 2009/0256868 A1 | 10/2009 | Low et al. |
| 2010/0001973 A1 | 1/2010 | Hotelling et al. |
| 2010/0019780 A1 | 1/2010 | Bulea |
| 2010/0045635 A1 | 2/2010 | Soo |
| 2010/0053380 A1 | 3/2010 | Ise |
| 2010/0060591 A1 | 3/2010 | Yousefpor et al. |
| 2010/0066692 A1 | 3/2010 | Noguchi et al. |
| 2010/0085324 A1 | 4/2010 | Noguchi et al. |
| 2010/0110040 A1 | 5/2010 | Kim et al. |
| 2010/0139865 A1 | 6/2010 | Tillement et al. |
| 2010/0182273 A1 | 7/2010 | Noguchi et al. |
| 2010/0193257 A1 | 8/2010 | Hotelling et al. |
| 2010/0194695 A1 | 8/2010 | Hotelling et al. |
| 2010/0194696 A1 | 8/2010 | Chang et al. |
| 2010/0194697 A1 | 8/2010 | Hotelling et al. |
| 2010/0194698 A1 | 8/2010 | Hotelling et al. |
| 2010/0214262 A1 | 8/2010 | Ishizaki et al. |
| 2010/0225612 A1 | 9/2010 | Ishizaki et al. |
| 2010/0265210 A1 | 10/2010 | Nakanishi et al. |
| 2010/0289765 A1 | 11/2010 | Noguchi et al. |
| 2010/0295804 A1 | 11/2010 | Takeuchi et al. |
| 2010/0295824 A1 | 11/2010 | Noguchi et al. |
| 2010/0302202 A1 | 12/2010 | Takeuchi et al. |
| 2010/0309162 A1 | 12/2010 | Nakanishi et al. |
| 2010/0321034 A1 | 12/2010 | Hargreaves |
| 2010/0328239 A1 | 12/2010 | Harada et al. |
| 2010/0328255 A1 | 12/2010 | Ishizaki et al. |
| 2010/0328256 A1 | 12/2010 | Harada et al. |
| 2010/0328257 A1 | 12/2010 | Noguchi et al. |
| 2010/0328259 A1 | 12/2010 | Ishizaki et al. |
| 2010/0328274 A1 | 12/2010 | Noguchi et al. |
| 2010/0328291 A1 | 12/2010 | Ishizaki et al. |
| 2011/0025635 A1 | 2/2011 | Lee |
| 2011/0042152 A1 | 2/2011 | Wu |
| 2011/0050585 A1 | 3/2011 | Hotelling et al. |
| 2011/0061947 A1 | 3/2011 | Krah et al. |
| 2011/0061948 A1 | 3/2011 | Krah et al. |
| 2011/0187677 A1 | 8/2011 | Hotelling et al. |
| 2011/0210939 A1 | 9/2011 | Reynolds et al. |
| 2011/0210940 A1 | 9/2011 | Reynolds |
| 2011/0210941 A1 | 9/2011 | Reynolds et al. |
| 2011/0227889 A1 | 9/2011 | Choi |
| 2011/0248949 A1 | 10/2011 | Chang et al. |
| 2011/0267293 A1 | 11/2011 | Noguchi et al. |
| 2011/0267305 A1 | 11/2011 | Shahparnia et al. |
| 2011/0285683 A1 | 11/2011 | Todorovich et al. |
| 2011/0316792 A1 | 12/2011 | Huang et al. |
| 2012/0044167 A1 | 2/2012 | Nakanishi et al. |
| 2012/0044195 A1 | 2/2012 | Nakanishi et al. |
| 2012/0092285 A1 | 4/2012 | Osborn et al. |
| 2012/0102191 A1 | 4/2012 | Rabii |
| 2012/0162104 A1 | 6/2012 | Chang et al. |
| 2012/0212521 A1 | 8/2012 | Yamauchi et al. |
| 2012/0218246 A1 | 8/2012 | Ueda et al. |
| 2012/0249476 A1 | 10/2012 | Schwartz et al. |
| 2013/0021309 A1 | 1/2013 | Kothari et al. |
| 2013/0057511 A1 | 3/2013 | Shepelev et al. |
| 2013/0342481 A1 | 12/2013 | Small et al. |
| 2014/0160041 A1 | 6/2014 | Kim et al. |
| 2014/0267217 A1 | 9/2014 | Lillie et al. |
| 2014/0320427 A1 | 10/2014 | Lee et al. |
| 2015/0355762 A1* | 12/2015 | Tripathi .................. G06T 1/20 345/173 |

FOREIGN PATENT DOCUMENTS

| | | |
|---|---|---|
| CN | 1940842 B | 5/2010 |
| EP | 1892605 A2 | 2/2008 |
| EP | 1936479 A1 | 6/2008 |
| EP | 1892605 A3 | 7/2008 |
| EP | 2330493 A2 | 6/2011 |
| JP | 2006106853 A | 4/2006 |
| JP | 2007334606 A | 12/2007 |
| JP | 2008090623 A | 4/2008 |
| JP | 2010072581 A | 4/2010 |
| KR | 1010850806 | 11/2011 |
| KR | 20120045992 | 5/2012 |
| KR | 101323044 B1 | 10/2013 |
| KR | 20140140935 A | 12/2014 |
| TW | 200945147 A | 11/2009 |
| WO | WO-0127868 A1 | 4/2001 |
| WO | WO-03019346 A1 | 3/2003 |
| WO | WO-2004045905 A2 | 6/2004 |
| WO | WO-2004046905 A3 | 8/2004 |
| WO | WO-2006054585 A1 | 5/2006 |
| WO | WO-2007003108 A1 | 1/2007 |
| WO | WO-2007012256 A1 | 2/2007 |
| WO | WO-2007102238 A1 | 9/2007 |
| WO | WO-2008050507 A1 | 5/2008 |
| WO | WO-2010009655 A1 | 1/2010 |
| WO | WO-2010137727 A1 | 12/2010 |

OTHER PUBLICATIONS

International Search Report and Written Opinion dated Jan. 8, 2015 for Application No. PCT/US2014/058393 Consists of 12 pages.

International Search Report and Written Opinion dated May 29, 2014 for Application No. PCT/US2014/016577.

International Search Report and Written Opinion dated Apr. 29, 2016 for Application No. PCT/US2016/012075. consists of 17 pages.

Transmittal of the International Preliminary Report on Patentability dated Jul. 20, 2017 for Application No. PCT/US2016/012075. consists of 14 pages.

* cited by examiner

TIME SHARING OF DISPLAY AND SENSING DATA

CROSS-REFERENCE TO RELATED APPLICATIONS

This application claims benefit of U.S. Provisional Patent Application Ser. No. 62/100,056, filed Jan. 5, 2015, which is incorporated by reference in its entirety.

BACKGROUND

Field

Embodiments of the present invention generally relate to input devices for touch sensing, and more specifically, to input devices that maintain substantially equal capacitive sensing frame reporting rates when operated at different display refresh rates.

Background of the Invention

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

When integrated with a display device, such as a tablet or smart phone, the time utilized for sensing is typically interleaved in some manner with display line updates or refresh. Nominal display refresh rate is 60 Hz (or less e.g., 24 or 48 for film, etc.) and may be variable, while sensing frame rate is typically 100-120 Hz and it is desirable for sensing measurement rate to remain relatively fixed as refresh rates and sensing frequencies vary (e.g., to avoid interference). In the event of that display refresh rate is changed, the evenly distributed time periods between display line updates also change, resulting in a corresponding change in the sensing frame rate when it is locked to the display line (e.g., Vblank, etc.) timing. However, accounting for changes in the sensing frame rate is a significant challenge, which increases the device complexity.

This there is a need for an improved input device which more easily handles changes in display rates.

BRIEF SUMMARY OF THE INVENTION

This disclosure generally provides input devices, processing systems and methods for touch sensing that maintain substantially equal capacitive sensing frame reporting rates when operated at different display refresh rates. In one example, an input device is provided that includes a display device integrated with a plurality of sensor electrodes, and a processing system operatively coupled to the plurality of sensor electrodes and to the display device. The processing system is configured to operate the sensor electrodes for capacitive sensing during a non-display update period, and operate in at least a first mode and a second mode. In the first mode of operation, the processing system is configured to update the display device at a first display refresh rate with a first capacitive sensing frame report rate during a first display update period. In the second mode of operation, the processing system is configured to update the display device at a second display refresh rate with a second capacitive sensing frame report rate during a second display update period, wherein the first display refresh rate and the second display refresh rate are substantially different (e.g., 25% difference between 48 Hz and 60 Hz, etc.) and wherein the first capacitive sensing frame report rate and the second capacitive sensing frame report rate are about equal (e.g., <8% difference between 128 Hz and 120 Hz, etc.) for at least half of the first and second display update periods.

In another example, a processing system is provided that includes a sensor module configured to operate a plurality of sensor electrodes during a non-display update period for capacitive sensing. The sensor module has sensor circuitry that is configured to operate in at least a first mode of operation and a second mode of operation. In the first mode of operation, the sensor circuitry is configured to update the display device at a first display refresh rate with a first capacitive sensing frame report rate during a first display update period. In the second mode of operation, the sensor circuitry is configured to update the display device at a second display refresh rate with a second capacitive sensing frame report rate during a second display update period, wherein the first display refresh rate and the second display refresh rate are different and wherein the first capacitive sensing frame report rate and the second capacitive sensing frame report rate are about equal for at least half of the first and second display update periods.

In another yet example, a method for operating an input device is provided that includes operating a plurality of sensor electrodes during a non-display update period for capacitive sensing; in a first mode of operation, updating a display device at a first display refresh rate with a first capacitive sensing frame report rate during a first display update period; and in a second mode of operation, updating the display device at a second display refresh rate with a second capacitive sensing frame report rate during a second display update period, wherein the first display refresh rate and the second display refresh rate are different (e.g., one more than 10% larger than another, etc.) and wherein the first capacitive sensing frame report rate and the second capacitive sensing frame report rate are about equal (e.g., both are less than 10% larger or smaller than the other, etc.) for at least half of the first and second display update periods.

BRIEF DESCRIPTION OF DRAWINGS

So that the manner in which the above recited features of the present invention can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
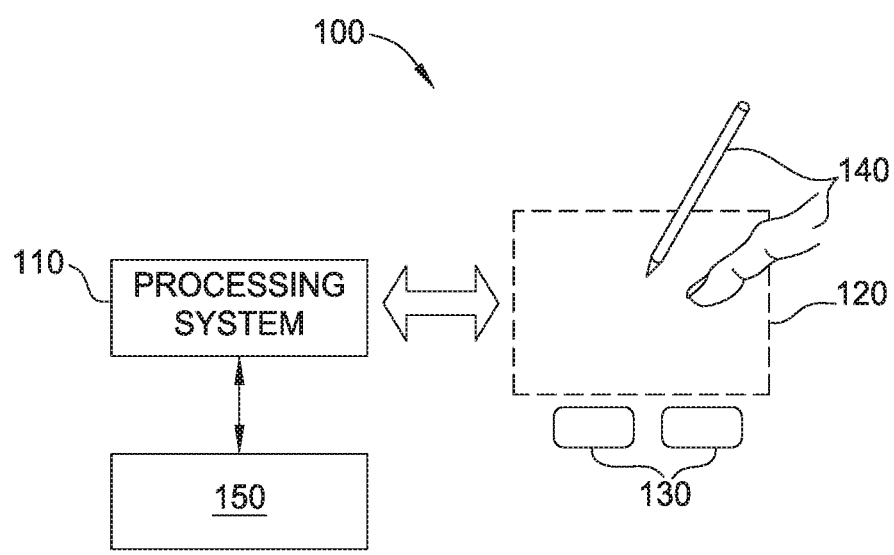
FIG. 1 is schematic diagram of an exemplary input device integrated with a display device.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Various embodiments of the present disclosure provide input devices, processing systems and methods for touch sensing that maintain substantially equal capacitive sensing frame (e.g., set of capacitive measurements covering the touch area, etc.) reporting rates when operated at different display refresh rates. In one example of operation at substantially equal capacitive sensing frame reporting rates, a first capacitive sensing frame reporting rate when operated at a first display refresh rate over a first display update period may be about equal to a second capacitive sensing frame reporting rate when operated at a second display refresh rate over a second display update period for at least half or more of the display update periods. Such input devices, processing systems and methods advantageously allow the display refresh rate to change for any number of reasons, while maintaining a substantially constant capacitive sensing frame reporting rate which enables more efficient and predictable touch sensing. As utilized herein, capacitive sensing is described as a touch sensing technique utilizing information received from capacitive sensing electrodes.

Turning now to the figures, FIG. 1 is a block diagram of an exemplary input device 100, in accordance with embodiments of the invention. The input device 100 may be configured to provide input to an electronic system 150. As used in this document, the term "electronic system" (or "electronic device") broadly refers to any system capable of electronically processing information. Some non-limiting examples of electronic systems 150 include personal computers of all sizes and shapes, such as desktop computers, laptop computers, netbook computers, tablets, web browsers, e-book readers, and personal digital assistants (PDAs). Additional example electronic systems 150 include composite input devices, such as physical keyboards that include input device 100 and separate joysticks or key switches. Further example electronic systems 150 include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system 150 could be a host or a slave to the input device.

The input device 100 can be implemented as a physical part of the electronic system 150, or can be physically separate from the electronic system 150. As appropriate, the input device 100 may communicate with parts of the electronic system 150 using any one or more of the following: buses, networks, and other wired or wireless interconnections. Examples include I$^2$C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes (e.g., full touch report rate mode, low display power mode, high interference mode, low touch power mode, etc.), as well as GUI actions such as cursor movement, selection, menu navigation, and other functions. In some embodiments, the processing system 110 provides information about the input (or lack of input) to some part of the electronic system 150 (e.g., to a central processing system of the electronic system that is separate from the processing system 110, if such a separate central processing system exists). In some embodiments, some part of the electronic system 150 processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system 150. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional"

positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system 150. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing (e.g., an Active Matrix of Thin Film a-Si transistors for AMOLED and AMLCD, etc.). As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
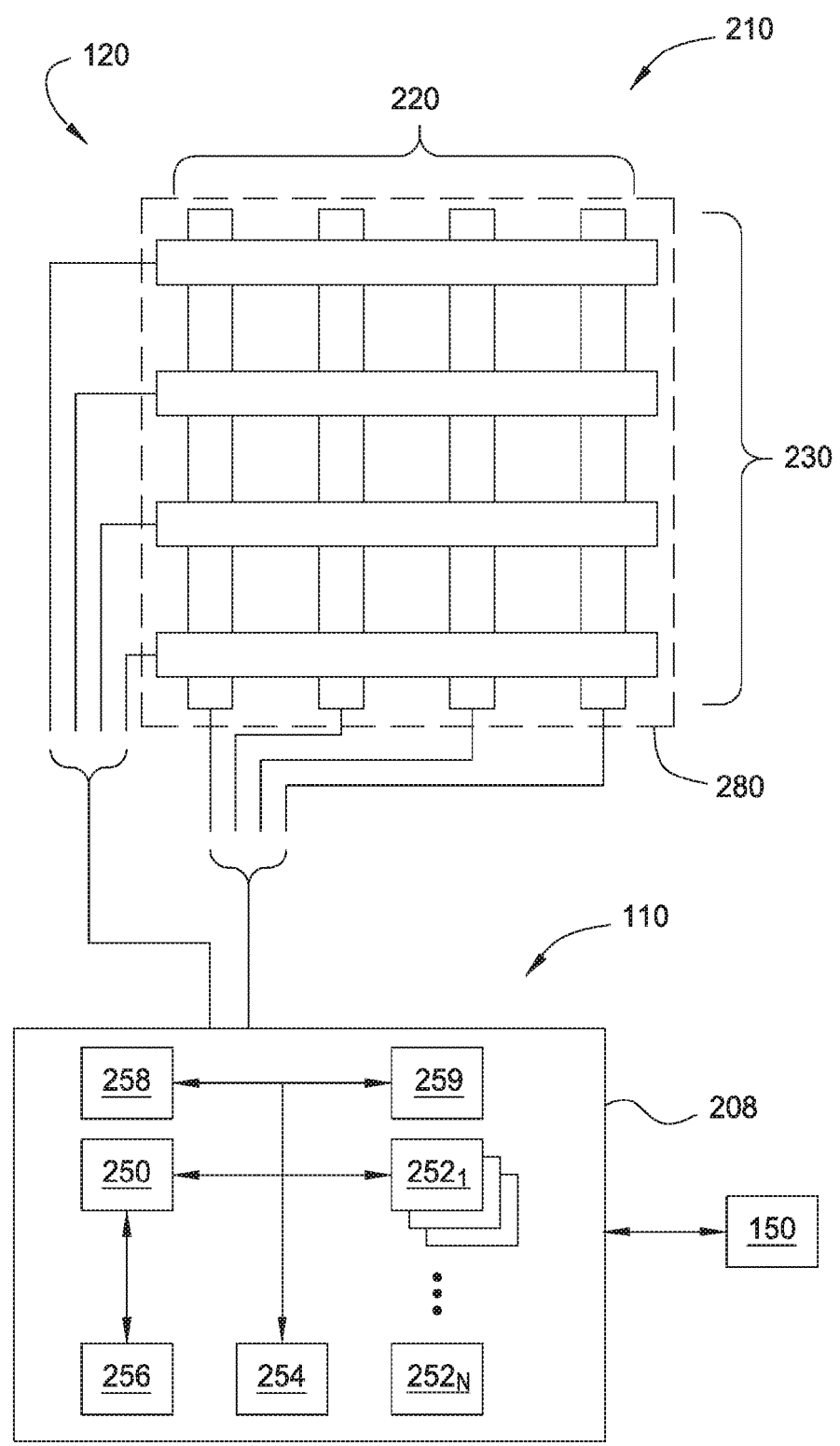
FIG. 2A is a schematic plan view of the input device of FIG. 1 illustrating an exemplary pattern of sensor electrodes of the input device coupled to a processing system.

FIG. 2A illustrates a portion of an exemplary pattern of sensing elements according to some embodiments. For clarity of illustration and description, FIG. 2A shows the sensing elements in a pattern of simple rectangles and does not show various components, such as various interconnects between the sensing elements and the processing system 110. The sensing elements disposed below the sensing region 120 may be arranged in an electrode pattern 210. The electrode pattern 210 comprises a first plurality of sensor electrodes 220 and a second plurality of sensor electrodes 230. The sensor electrodes 230 may be disposed orthogonally over the first plurality of electrodes 220. It is contemplated that the electrode pattern 210 may be configured with electrodes 220, 230 arranged in other suitable patterns. Further, the shape of sensor electrodes 230 may not be constrained to rectangular dimension, and may be tessellated or approximately space filling repeating array structure. In various embodiments, the first plurality of sensor electrodes 220 are operated as a plurality of transmitter electrodes (referred to specifically as "transmitter electrodes 220"), and the second plurality of sensor electrodes 230 are operated as a plurality of receiver electrodes (referred to specifically as "receiver electrodes 230"). In another embodiment, one plurality of sensor electrodes may be configured to transmit and receive and the other plurality of sensor electrodes may also be configured to transmit and receive. Further processing system 110 receives resulting signals with one or more sensor electrodes of the first and/or second plurality of sensor electrodes while the one or more sensor electrodes are modulated with absolute capacitive sensing signals. The first plurality of sensor electrodes 220, the second plurality of sensor electrodes 230, or both can be disposed within the sensing region 120. The sensor electrodes 220, 230 of the electrode pattern 210 can be coupled to the processing system 110.

The first plurality of electrodes 220 and the second plurality of electrodes 230 are typically ohmically isolated from each other. That is, one or more insulators separate the first plurality of electrodes 220 and the second plurality of electrodes 230 and prevent them from electrically shorting to each other. In some embodiments, the first plurality of electrodes 220 and the second plurality of electrodes 230 are separated by insulative material disposed between them at cross-over areas; in such constructions, the first plurality of electrodes 220 and/or the second plurality of electrodes 230 can be formed with jumpers and/or vias connecting different portions of the same electrode. In some embodiments, the first plurality of electrodes 220 and the second plurality of electrodes 230 are separated by one or more layers of insulative material. In such embodiments, the first plurality of electrodes 220 and the second plurality of electrodes 230 can be disposed on separate layers of a common substrate. In some other embodiments, the first plurality of electrodes 220 and the second plurality of electrodes 230 are separated by one or more substrates; for example, the first plurality of electrodes 220 and the second plurality of electrodes 230 can be disposed on opposite sides of the same substrate, or on different substrates that are laminated together. In some embodiments, the first plurality of electrodes 220 and the second plurality of electrodes 230 can be disposed on the same side of a single substrate.

The areas of localized capacitive coupling between the first plurality of sensor electrodes 220 and the second plurality sensor electrodes 230 may be form "capacitive pixels" of a "capacitive image." The capacitive coupling between sensor electrodes of the first and second pluralities 220 and 230 changes with the proximity and motion of input objects in the sensing region 120. Further, in various embodiments, the localized capacitive coupling between each of the first plurality of sensor electrodes 220 and the second plurality of sensor electrodes 230 and an input object may be termed "capacitive pixels" of a "capacitive image" (e.g., as part of a sensing measurement image frame, etc.). In some embodiments, the localized capacitive coupling between each of the first plurality of sensor electrodes 220 and the second plurality of sensor electrodes 230 and an input object may be termed "capacitive measurements" of "capacitive profiles" (e.g., where a profile may be a linear projection of an array of electrodes, etc.).

The processing system 110 can include a sensor module 208 having sensor circuitry. The sensor module 208 may include a sensing controller 250, and one or more source drivers (e.g., Chip On Glass COG or Chip On Flex COF ASICs, etc.) 252 (shown as $252_1$ to $252_N$, wherein N is an integer greater than 2). The sensing controller 250 uses the sensor circuitry to operate the sensor electrode pattern 210 to receive resulting signals from sensor electrodes in the sensor electrode pattern using a capacitive sensing signal having a sensing frequency (e.g., a square wave, sine wave or other narrow band carrier, etc.). In one or more embodiments, the sensor module 208 may comprise a synchronization module 254. Processing system 110 may also comprise one or more multiplexers coupled to sensor electrodes 220, 230. One or more sensor electrode from sensor electrodes 220 or 230 may be coupled to each multiplexer, where a multiplexer at least one of couples one or more sensor electrodes to the sensing circuitry and the source driver 252. Further, a multiplexer may be disposed within sensor module 208 or external to sensor module 208. The processing system 110 may comprise a timing controller 258. The processing system 110 may include a gate control module 259 which provides gate clocking and configuration signals (e.g., Clock1, Clock2, Clock3, Clock4, reset, start pulse, direction, output enable, gate voltage control, etc.) in the proper sequence for each line (e.g., first line of display frame, last line of display frame, vertical blank time, display line to non-display line transition, non-display line to display line transition, display line to display line transition, and non-display line to non-display line transition, repeated same line, etc.) to the gate logic (e.g., COG—Gate IC or TFT—Gate in Panel) during the frame controlled by the timing controller 258 and/or synchronization module 254.

The determination module 256 includes firmware and/or circuitry, and is configured to determine capacitive measurements from the resulting signals. The determination module 256 can track changes in capacitive measurements to detect input object(s) in the sensing region 120, and from the changes in capacitive measurements, provide a signal indicative of the location of the input object(s) in the sensing region 120. The processing system 110 can include other modular configurations, and the functions performed by the sensor module 208 can, in general, be performed by one or more modules in the processing system 110. The processing system 110 can include modules, and can perform other functions as described in some embodiments below.

The sensing module 208 of the processing system 110 can operate in an absolute capacitive sensing mode or a transcapacitive sensing mode. In an absolute capacitive sensing mode, receiver(s) in the sensor circuitry measure voltage, current, or charge on sensor electrode(s) in the electrode pattern 210 while the sensor electrode(s) are modulated with absolute capacitive sensing signals to generate the resulting signals. The determination module 256 generates absolute capacitive measurements from the resulting signals. The determination module 256 can track changes in absolute capacitive measurements to detect input object(s) in the sensing region 120.

In a transcapacitive sensing mode, transmitter(s) in the sensor circuitry of the sensing module 208 drive one or more of the first plurality of electrodes 220 with the capacitive sensing signal (also referred to as a transmitter signal or modulated signal in the transcapacitive sensing mode). Receiver(s) in the sensor circuitry of the determination module 256 measure voltage, current, or charge on one or more of the second plurality of electrodes 230 to generate the resulting signals. The resulting signals comprise the effects of the capacitive sensing signal and input object(s) in the sensing region 120. The determination module 256 generates transcapacitive measurements from the resulting signals. The determination module 256 can track changes in transcapacitive measurements to detect input object(s) in the sensing region 120. In various embodiments, one or more electrodes may be modulated with a shield signal to reduce extraneous charge coupling between electrodes. These electrodes may be other sensor electrodes, display electrodes or any other electrode in input device 100. Further, a modulated shield signal may be referred to as a guard signal and may have at least one of an amplitude, frequency and/or phase in common with the sensing signal driven onto the sensor electrode.

In some embodiments, the processing system 110 "scans" the electrode pattern 210 to determine capacitive measurements. Each line scanned of the electrode pattern 210 may be referred to as a sensing event. In the transcapacitive sensing mode, the sensing controller 250 of the processing system 110 can drive the first plurality of electrodes 220 to transmit transmitter signal(s). A line of the pattern of sensor electrodes may refer to a grouping of sensor electrodes. The line may be a row, column or any other grouping of sensor electrodes. Line rate refers to the period utilized to update a line, either for display updating or for capacitive sensing. Multiplexers may be used to define the order in which the sensor electrodes are scanned. The multiplexers may selectively configure which sensor electrode or sensor electrodes are coupled to the sensing circuitry of the determination module 256. The sensor circuitry may comprise a plurality of analog front ends (AFEs), each coupled to a multiplexer. The analog front end may comprise an integrator and other circuitry configured to integrate the amount of charge driven onto the sensor electrode. The analog measurement is typically converted into digital data by an Analog to Digital Converter (e.g., Successive Approximation ADC, Sigma Delta ADC or other ADC, etc.) so that digital processing may take place. The sensing controller 250 of the processing system 110 can operate the first plurality of electrodes 220 such that one transmitter electrode transmits at one time, or multiple transmitter electrodes transmit at the same time. Where multiple transmitter electrodes transmit simultaneously, these multiple transmitter electrodes may transmit the same transmitter signal and effectively produce a larger transmitter electrode, or these multiple transmitter electrodes may transmit different transmitter signals. For example, multiple transmitter electrodes may transmit different transmitter signals according to one or more coding schemes that enable their combined effects on the resulting signals of the second plurality of electrodes 230 to be independently determined. In the absolute capacitive sensing mode, the determination module 256 of the processing system 110 can receiving resulting signals from one sensor electrode 220, 230 at a time, or from a plurality of sensor electrodes 220, 230 at a time. In either mode, the sensing controller 250 of the processing system 110 can operate the second plurality of electrodes 230 singly or collectively to acquire resulting signals. In absolute capacitive sensing mode, the sensing controller 250 of the processing system 110 can concurrently drive all electrodes along one or more axes. In some examples, the processing system 110 can drive electrodes along one axis (e.g., along the first plurality of sensor electrodes 220) while electrodes along another axis are driven with a shield signal, guard signal, or the like. In some examples, some electrodes along one axis and some electrodes along the other axis can be driven concurrently. In the absolute capacitive sensing mode, the power supply of the source driver or PMIC may be isolated from system ground and modulated relative to system ground. The host display data interface may remain reference to system ground while the source driver processed display data and/or gate control signals are modulated relative to system ground.

In the transcapacitive sensing mode, the determination module 256 of the processing system 110 can use the resulting signals to determine capacitive measurements at the capacitive pixels. A set of measurements from the capacitive pixels form a "capacitive image" (also "capacitive frame") representative of the capacitive measurements at the pixels. The determination module 256 of the processing system 110 can acquire multiple capacitive images over multiple time periods (i.e., sensing events), and can determine differences between capacitive images to derive information about input in the sensing region 120. For example, the determination module 256 of the processing system 110 can use successive capacitive images acquired over successive periods of time to track the motion(s) of one or more input objects entering, exiting, and within the sensing region 120.

In absolute capacitive sensing mode, the determination module 256 of the processing system 110 can use the resulting signals to determine capacitive measurements along an axis of the sensor electrodes 220 and/or an axis of the sensor electrodes 230 (e.g., along one or more columns or rows). A set of such measurements forms a "capacitive profile" representative of the capacitive measurements along the axis. The determination module 256 of the processing system 110 can acquire multiple capacitive profiles along one or both of the axes over multiple time periods and can determine differences between capacitive profiles to derive information about input in the sensing region 120. For example, the determination module 256 of the processing system 110 can use successive capacitive profiles acquired over successive periods of time to track location or proximity of input objects within the sensing region 120. In other embodiments, each sensor electrode can be a capacitive pixel of a capacitive image and the absolute capacitive sensing mode can be used to generate capacitive image(s) in addition to or in place of capacitive profiles.

The baseline capacitance of the input device 100 is the capacitive image or capacitive profile associated with no input object in the sensing region 120. The baseline capacitance changes with the environment and operating conditions, and the determination module 256 of the processing system 110 can estimate the baseline capacitance in various ways. For example, in some embodiments, the determination module 256 of the processing system 110 takes "baseline images" or "baseline profiles" when no input object is determined to be in the sensing region 120, and uses those baseline images or baseline profiles as estimates of baseline capacitances. The determination module 256 can account for the baseline capacitance in the capacitive measurements and thus the capacitive measurements can be referred to as "delta capacitive measurements". Thus, the term "capacitive measurements" as used herein encompasses delta-measurements with respect to a determined baseline.

The time required to obtain a complete capacitive frame by scanning all the capacitive pixels across the sensing region 120 divided by the number of discreet capacitive scanning events defines the capacitive sensing frame rate. The capacitive sensing frame report rate is based on the duty cycle of the sensing module 208 and the duty cycle indicated by the host device of the electronic system 150 communicating with the input device 100. As discussed above, it is advantageous for the capacitive sensing frame rate to be maintained substantially constant, even when the display refresh rate and/or sensing frequency is changed. The methodology maintaining a fairly constant capacitive sensing frame rate is further detailed below.

In some touch screen embodiments, at least one of the first plurality of sensor electrodes 220 and the second plurality of sensor electrodes 230 comprise one or more display electrodes of a display device 280 used in updating a display of a display screen, such as one or more segments of a "Vcom" electrode (common electrodes), gate electrodes, source electrodes, anode electrode and/or cathode electrode. The updating or refresh of each line of the panel of the display device 280 may be referred to as a display line update event. These display electrodes may be disposed on an appropriate display screen substrate. For example, the display electrodes may be disposed on a transparent or flexible substrate (a glass substrate, TFT (e.g., amorphous silicon, indium gallium zinc oxide, low temperature polysilicon or other thin film transistor) glass, a polyimide flexible substrate, or any other transparent and/or flexible material) in some display screens (e.g., In Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. Conductive routing traces coupled to the sensor electrodes may be disposed in a metal layer of the display stack-up while the sensor electrodes may be disposed on a separate layer and be comprised of a transparent material (e.g., indium tin oxide, other metal oxides, etc.). Alternately, the sensing electrodes may be entirely composed of opaque metallic materials (e.g., molybdenum, aluminum, titanium, etc.) The display electrodes can also be referred to as "combination electrodes," since the display electrodes perform functions of display updating and capacitive sensing. In various embodiments, each sensor electrode of the first and second plurality of sensor electrodes 220 and 230 comprises one or more combination electrodes. In other embodiments, at least two sensor electrodes of the first plurality of sensor electrodes 220 or at least two sensor electrodes of the second plurality of sensor electrodes 230 may share at least one combination electrode. Furthermore, in one embodiment, both the first plurality of sensor electrodes 220 and the second plurality electrodes 230 are disposed within a display stack on the display screen substrate. Additionally, at least one of the sensor electrodes 220, 230 in the display stack may comprise a combination electrode. However, in other embodiments, only the first plurality of sensor electrodes 220 or the second plurality of sensor electrodes 230 (but not both) are disposed within the display stack, while other sensor electrodes are outside of the display stack (e.g., disposed on an opposite side of a color filter glass).

In an embodiment, the processing system 110 comprises a single integrated controller, such as an application specific integrated circuit (ASIC), having at least the sensing controller 250, the source drivers 252, the synchronization module 254, and the determination module 256 formed on a single IC chip. In another embodiment, the processing system 110 can include a plurality of integrated circuit (IC) chips, where the sensing controller 250, the source drivers 252, and synchronization module 254 (and optionally the determination module 256) can be divided among two or more IC chips. For example, at least the sensing controller 250 and synchronization module 254 can be configured as one integrated circuit chip. In some embodiments, a first portion of the sensor module 208 can be on one integrated circuit and a second portion of the sensor module 208 can be on second integrated circuit. In such embodiments, at least one of the first and second integrated circuits comprises at least portions of other modules such as a touch driver module and/or a display (i.e., source) driver module. In various embodiments, where the processing system 110 comprises a plurality of integrated circuits comprising a timing controller 258 (e.g., TCON IC) and source driver (e.g., COG) integrated circuits. The timing controller is typically configured receive display update data and sensing configuration data from a host device of the electronic system 150 communicating with the input device 100. Display data may also be internally generated by the sensing controller 250 to minimize latency between user input and user interface (UI) update, but typically this is an overlay (e.g., pop-up button, moving slider, cursor text selection, etc.) over host display images (e.g., rendered video, email application, web page, etc.). Overlay display image content (i.e., separate from the refresh rate) and sensing controller 250 display overlay response to user input (e.g., user touch input location or motion) may also be controlled by the electronic system 150. The timing control processes the received display update data and sensing configuration data and communicates the processed display data to each of the source driver integrated circuits. The TCON IC may contain a display data buffer (e.g., frame or line buffers) and may process (e.g., compress) and resynchronize the display data between the host and the source driver. The source driver integrated circuits comprise one or more source drivers, each coupled to and configured to drive a source line of the display device for display updating. Further, the source driver integrated circuit may comprise sensing circuit configured to modulate sensor electrodes and/or receive resulting signals from the sensor electrode for capacitive sensing. The TCON IC, source driver IC or host may comprise the determination module 256 configured to process the resulting signals to determine positional information. The source driver integrated circuits may be configured to communicate raw sensing data, partially processed sensing data or positional information to the timing controller, for further processing or the timing controller may directly communicate this information to the host. In other embodiments, the timing control may be configured to process the sensing data received from the source driver integrated circuits to determine positional information for one or more input objects. In various embodiments each source driver integrated circuit may comprise one or more of plurality of digital-to-analog converters (DAC), gamma control, source buffer, Vcom reference, data receiver, buffer, modulator, AFEs, etc. The timing controller may comprise one or more of a frame buffer (full or partial), host data receiver, gate control, determination module etc. A separate die containing RAM (e.g., Static or Dynamic Random Access Memory) for the frame buffer may be stacked on the TCON either as a die (e.g., with wire bonds connecting them) or as a wafer (e.g., with through Silicon Vias connecting them). A power management integrated circuit (PMIC) may be coupled to at least one of the timing controller and each source driver integrated circuit and may configured to provide (e.g., generate from a another supply voltage by inductive or capacitive boost circuits, etc.) a high gate voltage, low gate voltage, Vcom voltage, display voltage supply modulation, etc.

Figure 2B:
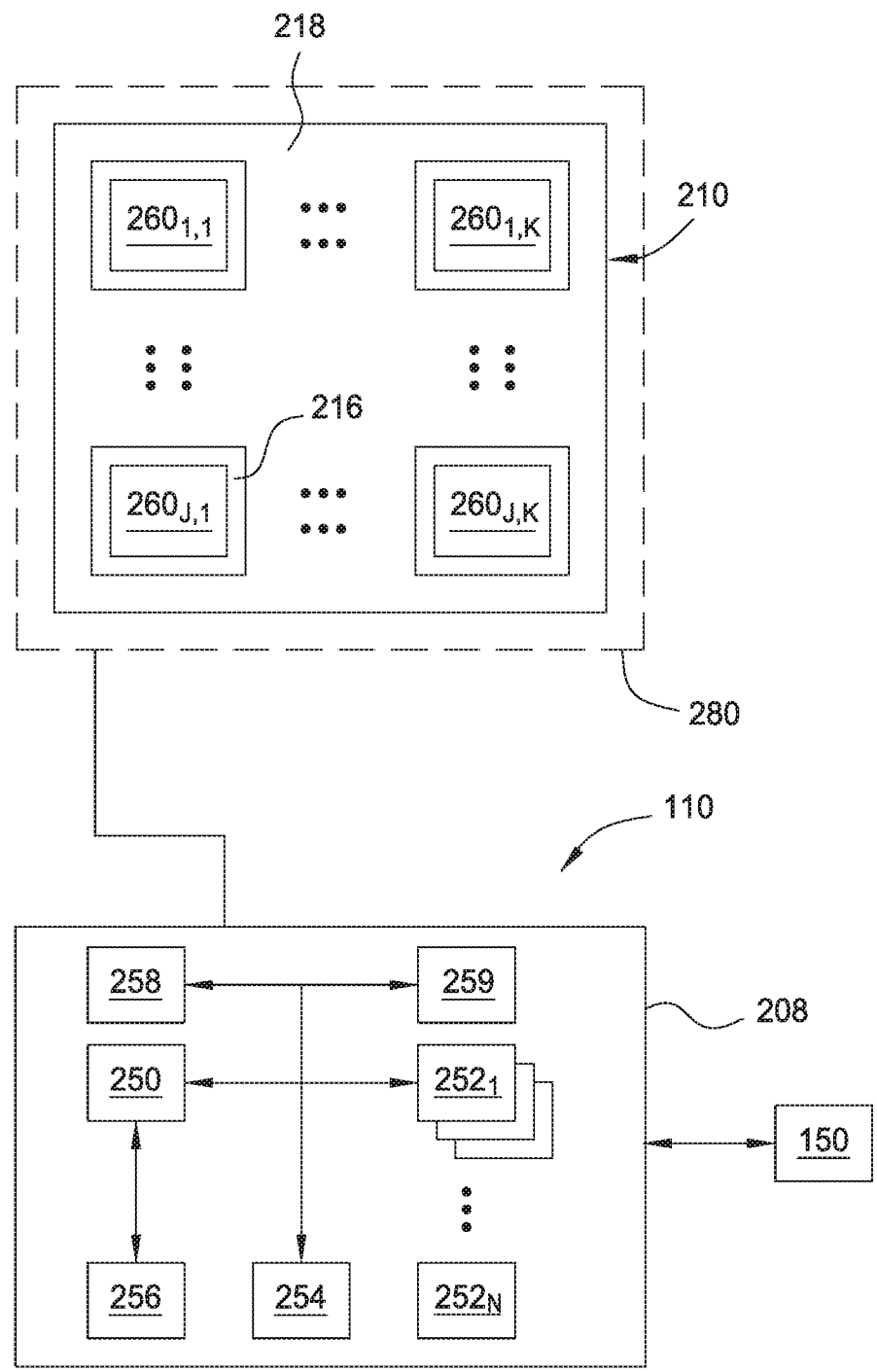
FIG. 2B is a schematic plan view of the input device of FIG. 1 illustrating another exemplary pattern of sensor electrodes of the input device coupled to a processing system.

FIG. 2B illustrates a portion of another exemplary pattern of sensing elements according to some embodiments. For clarity of illustration and description, FIG. 2B presents the sensing elements in a matrix of rectangles and does not show various components, such as various interconnects (e.g., routing, jumpers, vias, etc.) between the processing system 110 and the sensing elements. An electrode pattern 210 comprises a plurality of sensor electrodes 260 disposed in a rectangular matrix, or other suitable tessellated or approximately space filling repeating array structure. The electrode pattern 210 comprises sensor electrodes $260_{J,K}$ (referred to collectively as sensor electrodes 260) arranged in J rows and K columns, where J and K are positive integers, although one or J and K may be zero. It is contemplated that the electrode pattern 210 may comprise other patterns of the sensor electrodes 260, such as polar arrays, repeating patterns, non-repeating patterns, non-uniform arrays a single row or column, or other suitable arrangement. Further, the sensor electrodes 260 may be any shape, such as circular, rectangular, diamond, star, square, noncovex, convex, non-concave concave, interdigitated, interlocking, etc. Further, the sensor electrodes 260 may be sub-divided into a plurality of distinct sub-electrodes. The electrode pattern 210 is coupled to the processing system 110 as discussed above with reference to FIG. 2A.

The sensor electrodes 260 are typically ohmically isolated from one another. Additionally, where a sensor electrode 260 includes multiple sub-electrodes, the sub-electrodes may be ohmically isolated from each other. Furthermore, in one embodiment, the sensor electrodes 260 may be ohmically isolated from a grid electrode 218 that is between the sensor electrodes 260. In one example, the grid electrode 218 may surround one or more of the sensor electrodes 260, which are disposed in windows 216 formed in the grid electrode 218. The grid electrode 218 may be used as a shield or to carry a guarding signal for use when performing capacitive sensing with the sensor electrodes 260. Alternatively or additionally, the grid electrode 218 may be used as sensor electrode when performing capacitive sensing. Furthermore, the grid electrode 218 may be co-planar with the sensor electrodes 260, but this is not a requirement. For instance, the grid electrode 218 may be located on a different substrate or on a different side of the same substrate as the sensor electrodes 260. In other embodiments, the grid electrode 218 may be segmented into a plurality of grid electrode segments. In other embodiments, input device 100 may comprise a plurality of grid electrodes 218. Processing system 110 may be coupled to the one or more grid electrodes 218 and acquire sensing data from the grid electrodes. The sensing data may be used to determine (e.g., based on a change in user input coupling touch signal, stylus data, or external interference, etc.) which mode or which sensor electrodes to drive for capacitive sensing. In other embodiments, sensing data received from one or more of the sensor electrodes may be used to determine which of the one or more grid electrodes is driven for capacitive sensing. The grid electrode 218 is optional and in some embodiments, the grid electrode 218 is not present.

In a first type of operation, the processing system 110 can use at least one sensor electrode 260 to detect the presence of an input object via absolute capacitive sensing. The sensor module 208 can measure voltage, charge, or current on sensor electrode(s) 210 to obtain resulting signals indicative of a capacitance between the sensor electrode(s) 210 and an input object. The determination module 222 uses the resulting signals to determine absolute capacitive measurements. When the electrode pattern 210 is arranged in a matrix array, the absolute capacitive measurements can be used to form capacitive images.

In a second type of operation, the processing system 110 can use groups of the sensor electrodes 260 to detect presence of an input object via transcapacitive sensing. The sensor module 208 can drive at least one of the sensor electrodes 260 (or grid electrode 218) with a transmitter signal, and can receive a resulting signal from at least one other of the sensor electrodes 260. The determination module 222 uses the resulting signals to determine transcapacitive measurements and form capacitive images (or profiles, etc.).

The input device 100 may be configured to operate in any one of the modes described above. The input device 100 may also be configured to switch between any two or more of the modes described above. The processing system 110 can be configured as described above with respect to FIG. 2A. Further, the input device 100 may be configured to operate in additional modes. For example, the input device 100 may be configured to operate in an interference measurement mode. In the interference measurement mode, the processing system 110 is configured to receive resulting signals with one or more of the sensor electrodes and/or grid electrodes while the sensor electrodes and/or grid electrode is not substantially modulated relative to system ground. The resulting signals may be used to determine interference measurements. The interference may be from system power sources, input object coupled, local power supplies, etc. Alternately, resulting signals may be used to rapidly determine the presence of user input over a period of time to enter or leave a low power mode.

Figure 3:
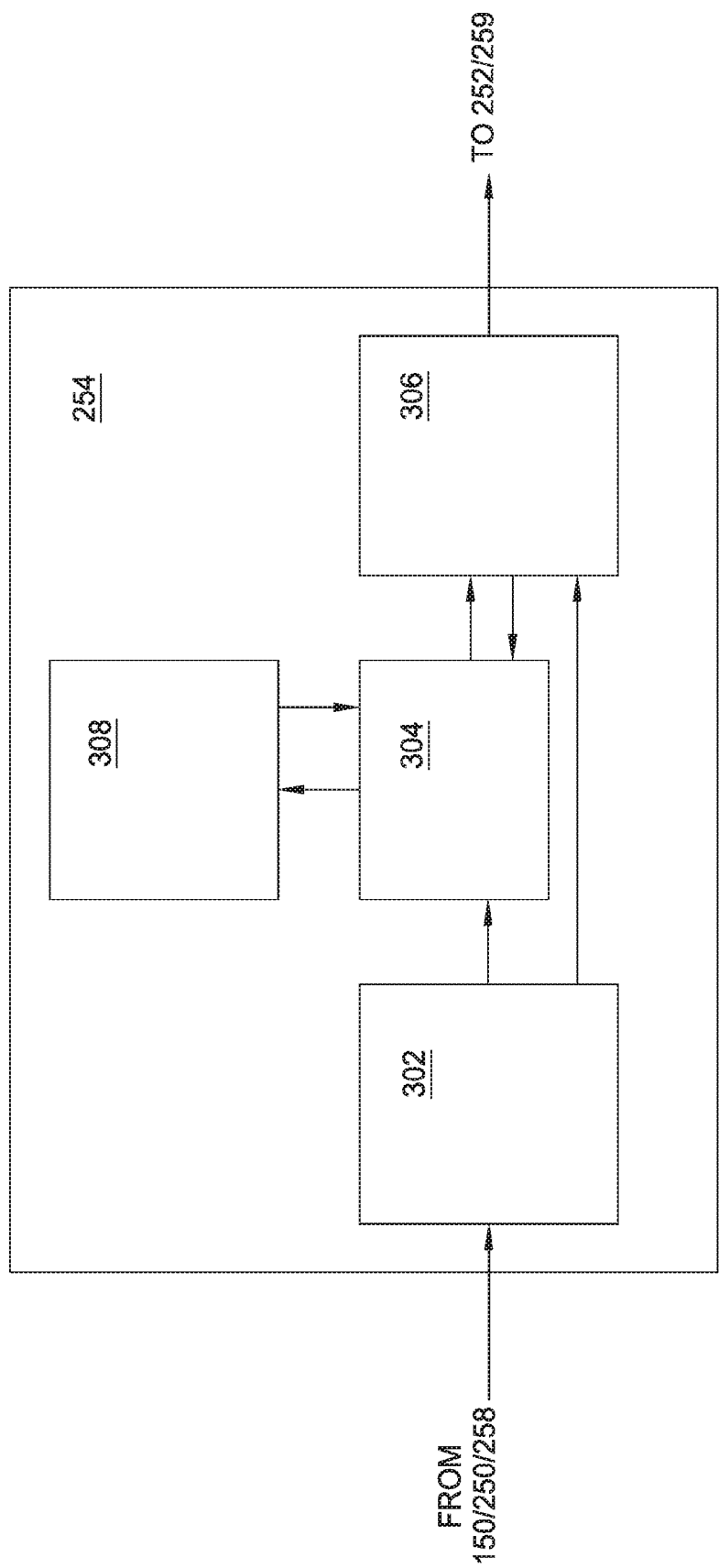
FIG. 3 is a block diagram of one embodiment of a synchronization module of a processing system.

FIG. 3 is a block diagram of one embodiment of the synchronization module 254 of the processing system 110. The synchronization module 254 includes synchronization circuitry configured to control the capacitive frame reporting rate. The synchronization circuitry of the synchronization module 254 may also be configured to schedule display line updating events and sensing events. Additionally, the synchronization circuitry of the synchronization module 254 may also be configured to control the time period and sequence relative to the display line updates (i.e., display source data refresh and gate selection) in which the sensing events (e.g. ADC capture of the touch pixel images) occur.

The synchronization circuitry of the synchronization module 254 includes an input block 302 (e.g., operating in the host display data interface clock domain), a synchronization control block 304, an output block 306 (e.g., operating on the source driver processed data domain) and a buffer block 308. The input block 302 communicates with the synchronization control block 304 and the output block 306. The input block 302 provides the synchronization control block 304 with touch and/or display update information provided by the timing controller 258 the sensing controller 250 or directly from the host display data interface (e.g., by bypassing the timing controller and/or sensing controller). The input block 302 also provides the synchronization control block 304 and/or the output block 306 with a display timing signal (e.g., Vertical blank, STV—Start of Video, a line signal, etc.).

The output block 306 is coupled between the synchronization control block 304 and the source driver(s) 252 and gate driver 259. The output block 306 is primarily used for line based touch sensing and/or display update event scheduling (e.g., in the source and gate driver clock domain).

The synchronization control block 304 is coupled to the buffer block 308, the input block 302 and the output block 306. The synchronization control block 304 arbitrates between the read/write requests from the input block 302 and the output block 306. The synchronization control block 304 allows the time-per-display-line at the output block 306 to be artificially reduced or increased—limited by the panel size of the display device 280 being driven and the buffer size of block 308—and the extra lines (or additional fractional lines), which are not used for display, can be allocated for touch or non-touch operation.

The buffer block 308 isolates the input block 302 and the output block 306 of the synchronization module 254. The buffer block 308 is utilized to regulate the line time (line rate) difference between information received from the input block 302 and the output block 306. The buffer block 308 includes a data buffer that is sufficiently sized to allow the synchronization control block 304 to store at least one line worth of display update data, such that the synchronization module 254 may insert (or remove) one or more synchronization delay lines into the touch and display timing sequence in response to the buffer not having enough data to update or refresh a complete display line. The buffer block and synchronization module may operate in a separate buffer clock domain or may reside in either of the input or output clock domains. In some cases the buffer may be bypassed by the synchronization module allowing display line data to transfer directly from input block 302 to output block 306 (e.g., in the case of a buffer overflow, low power mode, etc.).

In one or more embodiments, the buffer may be large enough to limit overflow for the input display data line rate received from the host display data interface (e.g., from electronic system 150) during the longest blanking period before display update starts. The output line rate may be fast enough to limit overflow for the data received, during the largest fraction of the blanking period during a display frame. The blanking period is the time between display line update periods of a display frame. The blanking periods may be horizontal blanking periods such that they provide time to avoid gate non-overlapping. Further, some blanking periods may be long horizontal blanking periods (i.e., at least as long as a non-blanking display update line) that occur between display line update periods, during which user input sensing may be performed. Some long horizontal blanking may be synchronization blanking periods (i.e., substantially the same length as a display update line), which maintain synchronization as refresh rates, sensing frequencies, and capacitive sensing frame rates change. Synchronization blanking periods may be used for user input sensing, interference sensing, etc. The blanking periods may also occur between display frames, which is conventionally known as a vertical blanking period (shown as by reference numeral 401 in FIG. 4) and is typically more than 1 display line update period in length. In one or more embodiments, a long horizontal blanking period occurs between two display line update periods of a display frame and is at least as long as a display line update period. Further, each display frame may comprise a plurality of horizontal blanking periods, at least one long horizontal blanking period and at least one vertical blanking period. Gate control logic 259 may provide different sequencing signals (e.g., clocks, enables, resets, to a panel gate driver to transition between various lines (e.g., vertical blanking lines, display update lines, long horizontal blanking lines, and synchronization lines) to minimize display image or touch sensing artifacts. Processing system 110 may be configured to drive one or more of the sensor electrodes for capacitive sensing during the long horizontal blanking periods. In other embodiments, processing system 110 is configured to acquire interference measurements from one or more sensor electrode during one or more long horizontal blanking periods. In still other embodiments the processing system 110 is configured to acquire stylus data (e.g., force, stylus button state, stylus ID number, etc.).

In one embodiment, when the input line rate is constant and the output line rate is fixed for over at least half of a display refresh period, there is a number of additional output lines and/or fractional lines where the display electrodes are not driven for capacitive sensing. For example, a gate line selection may not increment (e.g., a token in a shift register may not clock to the next gate line output buffer on the gate driver) to the next display line during a blanking period. Furthermore, in order to minimize the buffer size used to synchronize the input line rate and the output line rate while distributing the synchronization lines to minimize (and improve sensing frame report latency) display artifacts, a blanking period buffer may be included. In such an instance, the input line rate may not be known (i.e., perhaps only the maximum and minimum rates are known) at the beginning of the display frame or the input line rate varies within a display frame. Additionally, the buffer usage may be distributed through the display frame refresh, to allow the buffer to fill and empty multiple times during a display frame.

For example, should the synchronization module 254 determine that a change in the input display refresh line rate would increase the capacitive sensing frame rate at the current display line rate, the synchronization module 254 may insert one or more synchronization delay lines to maintain the capacitive sensing frame rate substantially despite of the change. In another example, should the synchronization module 254 determine that a change in the display refresh rate would decrease the capacitive sensing frame rate, the synchronization module 254 may remove one or more synchronization delay lines to maintain the capacitive sensing frame report rate substantially despite of the change. In other embodiments, the synchronization module may be configured to change the capacitive sensing frame rate or capacitive sensing frequency and/or display line rate based on a measured interference. In such embodiments, display updating and capacitive sensing may occur during at least partially overlapping periods. Further, the display updating and capacitive sensing may be fully overlapping. In such embodiments, at least one sensor electrode is driven (e.g., Vcom voltage changed relative to system ground) for capacitive sensing while at least one display electrode is driven (e.g., source voltage is changed and/or gate is selected) for display updating. When the capacitive frame rate (e.g., number of display line times per capacitive sensing measurement) is coupled to the display frame rate (e.g., number of display update line times per full display update) and the frequency of the sensing signal is based on the capacitive frame rate (e.g., 2 sensing frequency cycles per display line, 1 sensing frequency cycle per 2 display lines, or other ratio), by adding or removing one or more synchronizing delay lines, the capacitive frame rate and/or the frequency of the sensing signal may be changed at a substantially constant display refresh rate. In one embodiment, the power supply signals of the display device and the sensing device may be modulated relative to system ground to measure user input. The modulated signals may be provided by a power management integrated circuit (PMIC). As the sensor electrodes of the sensing device may comprise one or more display electrodes of the display device (e.g., VCOM for an LCD, Cathode for an OLED, etc.), since the power supply signals are modulated, display updating and capacitive sensing may occur in at least partially overlapping periods.

During synchronization delay lines, the processing system 110 may be configured to not drive the sensor electrodes for capacitive sensing and display electrodes for display updating. Further, a long horizontal blanking period may comprise one or more synchronization delay lines that may occur at the beginning of the long horizontal blanking period, at the end of the long horizontal blanking periods and/or at the middle of a long horizontal blanking period. The synchronization module 254 may insert any number of synchronization delay lines into the long horizontal blanking period, such that the long horizontal blanking period may be at least as long as one synchronization delay line.

Figure 4:
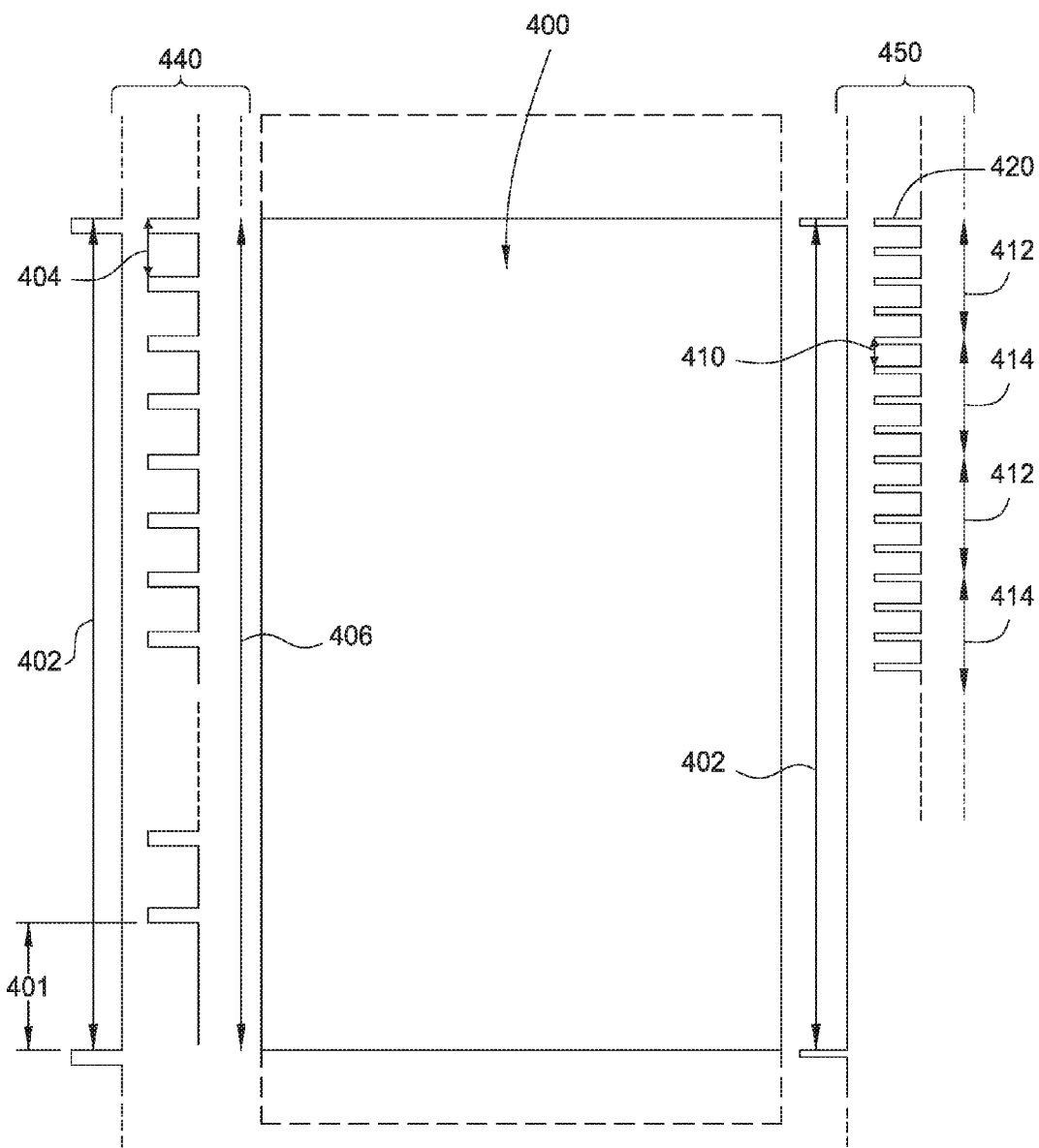
FIG. 4 is a schematic diagram of the operation of synchronization module of FIG. 3.
Figure 5:
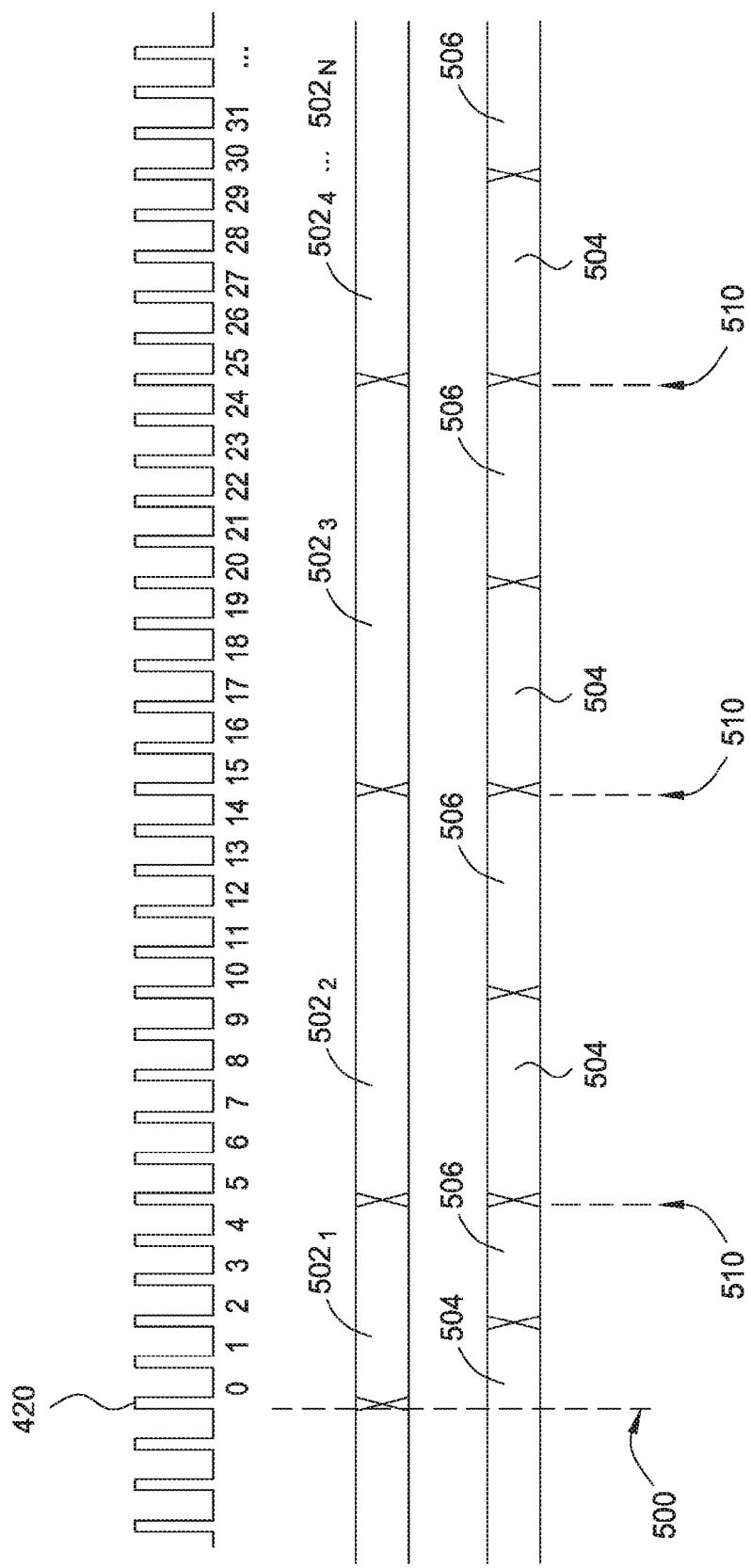
FIG. 5 is a timing diagram illustrating scheduling of touch sensing and display updating events.

FIGS. 4-5 are schematic timing diagrams which illustrate examples of the operation of synchronization module 254 of FIG. 3. FIG. 4 is a schematic timing diagram illustrating touch sensing and display updating events, while FIG. 5 is a timing diagram illustrating scheduling of touch sensing and display updating events. Referring first to FIG. 4, the center box 400 represents a display update period 406, with a portion of the previously updated display frame shown in phantom above the box 400 and portion of the next display frame to be updated shown in phantom below the box 400. The timing lines to the left of the box 400 and labeled as 440 are provide as input to the input block 302, while timing lines to the right of the box 400 and labeled as 450 are provide as input to the output block 306.

Figure 4A:
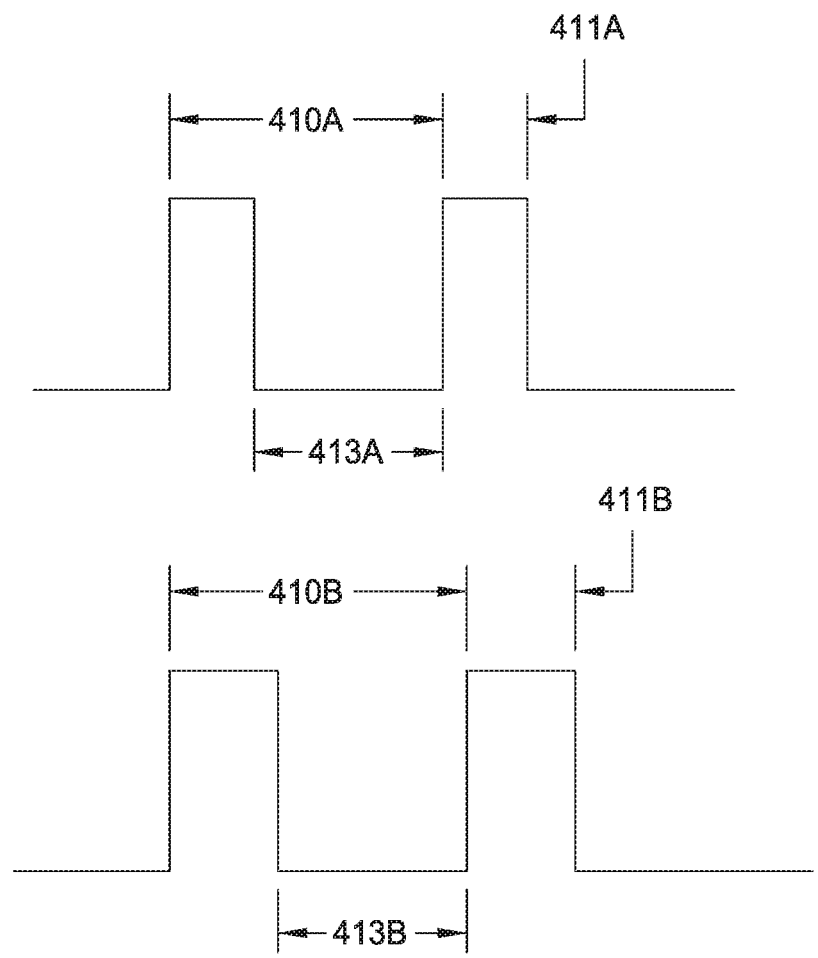
FIG. 4A illustrate two timing diagrams contrasting different horizontal blanking periods in timing sequences having the same constant display line update time.

During each display update period 406, all the lines in a panel of the display device 280 are updated over a single display refresh cycle. The time between the first display line to be updated and the last display line to be updated defines the display frame time 402. Typically, the display update period 406 is updated at a rate referred to as a display refresh rate of about 60 Hz. However, the display refresh rate may be adjusted as desired to meet display or sensing needs (e.g., the display of cinema video shot at 24 frames per second, etc.). Information for updating each display line generally occurs periodically, such as defined by the line time 404. In some embodiments, the display update period 406 may vary with the input frame rate. Further a delay may be inserted at or before the start of display frame time 402. The information for updating each display line is provided by the TCON 258 to the input block 302 at the period indicated by each line time 404. The display frame time 402 comprises a horizontal blanking period between (e.g., before or after) each display line update period (e.g., while the gate is selected and source output voltage sets that display line's value). Further at the end of display frame time 402 (i.e., between frames), a frame start signal may be sent and this may be used to reset a gate driver shift register. The host display data interface may provide either constant or variable input line rate 404 and constant or variable vertical blanking time 401 when display input refresh rate is changed. As is shown in FIG. 4A, a variable horizontal blanking period is shown by 411a and 411b and a constant display line update time is shown by 410a and 410b. Such a variable horizontal blanking time may be present in the output timing generated by block 306.

The synchronization module 254 utilizes the information received by the input block 302 and display data stored in the buffer block 308 to schedule times for updating the display lines and performing capacitive sensing. Since updating the display and performing capacitive sensing can require significantly more (e.g., 50 lines, hundreds of lines, to thousands of lines, etc.) line time driving events (e.g., display output lines, long horizontal blanking lines, or synchronization lines, etc.) than simply updating the display alone (i.e., only display output lines and vertical blanking lines), the line update time 410 (as defined between to resync trigger pulses 420 generated by the input block 302) provided by the output block 306 is significantly shorter in duration than the line time 404 provided to the input block 302. The shorter line time 410 allows the display frame time 402 to be segmented into a plurality of sensing intervals 412 and a plurality of display update intervals 414. The synchronization control block 304, coupled with the buffer block 308, allows the time allocated to both the sensing intervals 412 and the display update intervals 414 to be adjusted so that the capacitive sensing frame rate, which occurs over each sensing interval 412, to remain substantially constant even if the display refresh rate changes. The timings of the sensing intervals 412 may (e.g., for ease of configuration) be measured in lines or line timings. In some embodiments, it may also be comprised of fractional lines. The horizontal blanking periods 411a and 411b may be varied to allow a variable number of output lines even as the display line update periods (e.g., 413a and 413b) remain substantially constant to minimize display artifacts.

Referring now to FIG. 5, the resync trigger pulses 420 establishes the cadence of touch sensing, display updating and synchronization delay events. The first resync trigger pulse 420 is labeled as "zero" which corresponds to when information for the first input display line is written into the buffer block 308, which may also be thought of as the beginning of the display update period 406 and display frame time 402 (shown by dashed line 500). The subsequent resync trigger pulses 420 sequentially increase from "zero" until the display update period 406 is complete at the end of the display frame time 402. In one or more embodiments, the number of output display lines equals the number of input display lines (i.e., not including vertical blanking lines). Synchronization lines may be added when there is an underflow of the buffer.

The display update period 406 may be segmented into discreet scheduling windows (collectively referred to as scheduling windows 502) wherein at least one or more of a touch sensing, display updating and synchronization delay event occurs. During most scheduling windows 502, both touch sensing and display updating events occur. During some scheduling windows 502, a synchronization delay event may be inserted or adjusted to maintain the desired capacitive sensing frame reporting rate. Dashed lines 510 are utilized to indicate the beginning and end of adjacent scheduling windows 502.

In the timeline depicted in FIG. 5, an initial (e.g., first) scheduling window $502_1$ begins at first resync trigger pulse 420 (zero), followed sequentially by scheduling window $502_N$, where N is the number of scheduling windows 502 which comprise a single display update period 406 within a predefined display frame time 402. In the embodiment depicted in FIG. 5, each scheduling windows 502 includes at least a touch sensing interval 506, and optionally (and predominantly) a display update interval 504. The touch sensing interval 506 may also be a non-display update period of the display refresh update period 406 or as a non-display update interval of the display update period 406 as shown in During the display update interval 504, the lines in that portion of the display are refreshed with information from the source drivers 252 (e.g., the gate drivers are selected to update stored charge at those display pixels in an active matrix display). During at least a portion of the touch sensing interval 506, the lines (i.e., sensor electrodes 230) in that portion of the display are driven by the touch controller 250 for touch sensing, while resulting signals comprising effects of the signal driven on the sensor electrodes 230 are received by the sensor electrodes 220 and provided to the determination module 256 for determining the presence of an input object 140 in the sensing region 120.

The duration of the first scheduling window $502_1$ may be treated differently from the subsequent scheduling windows 502 (e.g., windows $502_2$ through $502_{N-1}$) due to there being only one line worth of data in the buffer block 308, so the first scheduling window $502_1$ is essentially totally allocated for capacitive sensing operation over the capacitive sensing interval 506. The subsequent scheduling windows $502_2$ through $502_{N-1}$ may be used to allocate additional time for display updating (i.e., longer display update intervals 504), while the capacitive sensing intervals 506 within the scheduling windows $502_2$ through $502_{N-1}$ are adjusted by adding or adjusting a synchronization delay. This allows the touch sensing rate (and consequently the capacitive sensing frame report rate), defined as how many touch periods per unit time, will stay roughly constant or always at a higher rate than the display refresh rate, regardless of how the display refresh rate may vary. In some embodiments, the capacitive frame rate is at least 10 Hz greater than the display frame rate. The scheduling windows $502_N$ may be treated differently depending on the display frame time 402 remaining, and if display line information is available for updating the first display line in the next display frame. Where a sensing period 506 in window $502_N$ has not completed before the first line of the next display refresh frame is received, it may continue while the sensing period 506 within the first window $502_1$ of the next refresh frame may be canceled. Alternately, a sensing period 506 may not normally be scheduled in the first sensing window $502_1$ except in the case where sensing period 506 from the last window $502_N$ of a previous frame cannot complete before the first line of the next display refresh frame is received.

The buffer block 308 of the synchronization module 254 provides a higher line rate at the output of output block 306, and thus, the display refresh rate at the input block 302 (more time per line or fewer vertical blanking lines) can be balanced against the output of the output block 306 (less time per line) over a short period of time, while supporting touch operation when there is no display data at the output of output block 306. For example, when changing from operating in first mode at a nominal display refresh rate of 60 Hz to a different, such as a reduced, display refresh rate when operating in a second mode or when the sensing frequency changes to avoid interference, the number of output line times per frame at output of output block 306 will increase proportionally (i.e., the output line rate will increase), and automatically result in more lines being available to touch operations during the touch sensing interval 506 during the second mode of operation (e.g., allocated to non-display time between display update lines comprised of capacitive sensing time and synchronization delay lines). Alternately, the output block 306 may maintain a relatively constant output line rate and period 410 sufficient to provide the maximum required non-display sensing time at the maximum required input display refresh line rate for the shortest input line period 404 and inserting synchronization lines as necessary. The result is that capacitive sensing frame report rate that will be almost constant over at least half of the display update period over the display frame time. In some embodiments, the capacitive sensing frame rate may maintain a constantly higher rate than the display refresh rate. Small variation may occur due to frame boundary conditions, for example at scheduling windows $502_1$ and $502_N$ occurring at the beginning and end of the display update period 406, which prevent the capacitive sensing frame rates to be exactly equal for the entire display update periods 406 of each operational mode, but allow for synchronization between the capacitive sensing frame and display frame.

Figure 6:
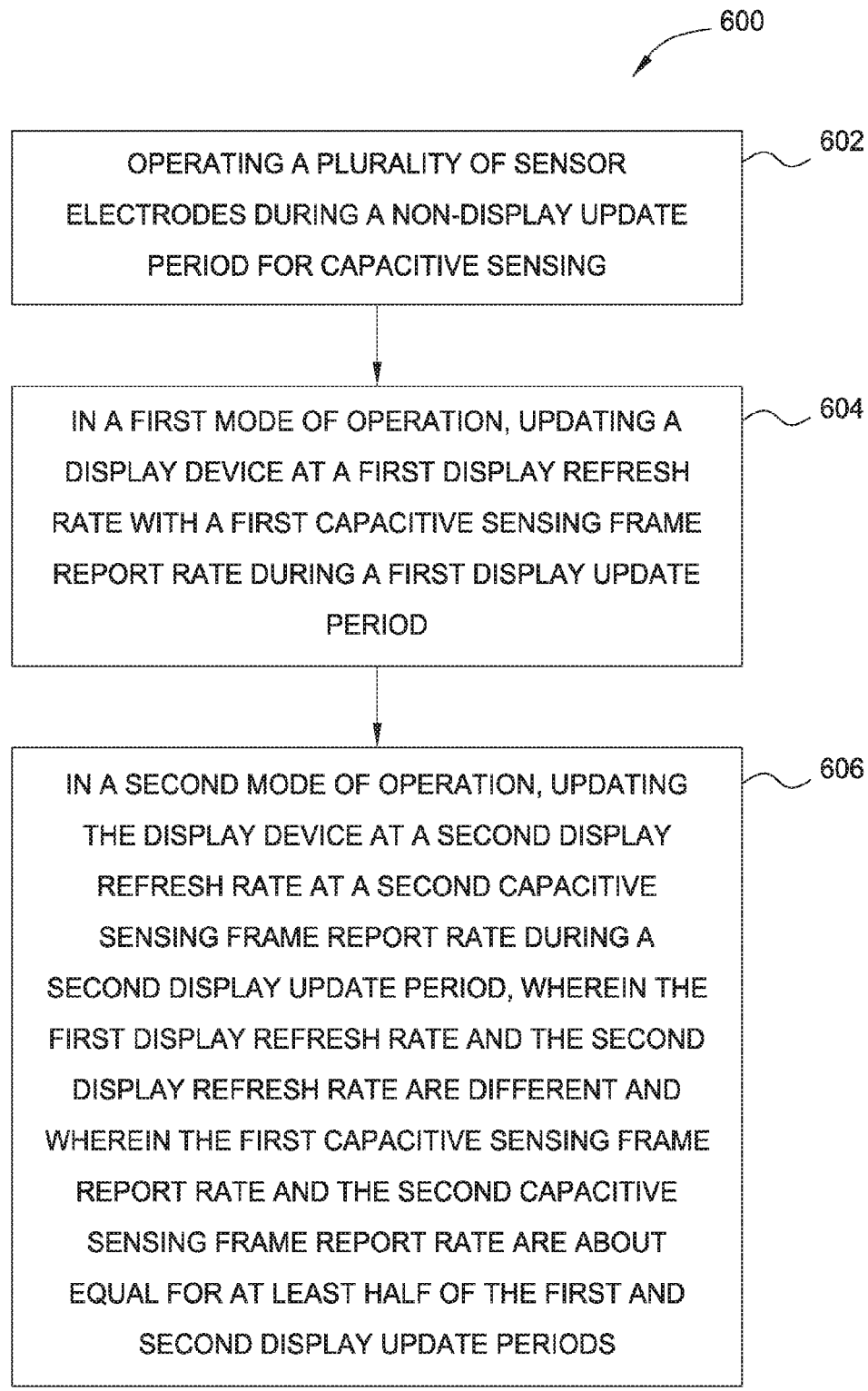
FIG. 6 is a flow diagram of a method for operating an input device.

FIG. 6 is a flow diagram of a method 600 for operating an input device, such as the input device 100 described above, among others. The method 600 begins at operation 602 by operating a plurality of sensor electrodes during a non-display update period for capacitive sensing. The sensor electrodes, such as one or more of the sensor electrodes 220, 230, 260 and the like, may be operated using either a transcapacitive or absolute sensing technique.

At operation 604, the input device 100, is operating in a first mode of operation. While operating in the first mode of operation, the display device 280 is updated at a first display refresh rate while capacitive sensing is performed at a first capacitive sensing frame report rate over a first display update period. Typically, the period of time for the capacitive frame rate acquisition (e.g., 10 ms for 100 Hz) will be less than the display refresh (e.g., 20 ms to 16 ms for 50 Hz to 62.5 Hz). In the first mode of operation, the display device is updated at a first display refresh rate while the sensor electrodes for capacitive sensing are driven at a first capacitive sensing frame rate during a first display frame, wherein the first capacitive sensing frame rate is greater than the first display refresh rate.

Subsequently at operation 606, the operational mode of the input device 100 changes to a second mode of operation. While operating in the second mode of operation, the display device 280 is updated at a second display refresh rate. The second display refresh rate is different than the first display refresh rate. For example, the first display refresh rate may be about 60 Hz while the second display refresh rate may be reduced to a lower refresh rate or a higher refresh rate. Capacitive sensing is performed at a second capacitive sensing frame rate over a second display update period. A difference between the capacitive sensing frame rate performed during the first display update period and the second display update period may be expressed as an amount, which is less than the difference between the first and second display refresh rates. Although the refresh rates are different while operating in the first and second modes, the second capacitive sensing frame rate is maintained substantially equal to the first capacitive sensing frame rate over at least half of the first and second display update periods.

As discussed above, in order to maintain capacitive sensing frame rates substantially equal while the display refresh rates changes, a synchronizing delay is selected to maintain capacitive sensing frame rate substantially constant relative to the capacitive sensing frame rate of the first mode of operation. The delay time provided by synchronizing delay may be configured as one or more discrete synchronizing delay lines, or by selecting an appropriate time length for the synchronizing delay line. The presence and/or duration of the synchronizing delay line(s) is controlled by the synchronization control block 304 of the synchronization module 254. The synchronization control block 304 may insert or adjust the duration of the synchronizing delay line during the non-display updating periods (i.e., during the touch sensing intervals 506) of at least half of the scheduling windows 502 comprising a single display update period 406. The synchronization control block 304 may insert the synchronizing delay line between display updating intervals. The synchronization control block 304 may insert the synchronizing delay line between touch sensing intervals. The synchronization control block 304 may insert the synchronizing delay line between sequential display updating and touch intervals. Alternatively, or in addition to, the synchronization control block 304 may insert or adjust the duration of the synchronizing delay line during a non-display updating period occurring after the last the display update interval 504 but before the beginning of the subsequent the display update period 406: this non-display updating period also known as a vertical blanking period.

The following are some non-limiting examples of the use of a synchronizing delay line that may be inserted into a display update period. In a first example, a first source line is driven with display data to update a pixel in the display during a first period of time during the second mode of operation while at least one of the plurality of sensor electrodes is driven during a second period of time. At least one synchronizing delay line is inserted between the first period of time and the second period of time, wherein a length or number of the synchronizing delay line is selected to maintain capacitive sensing frame rate substantially constant relative to the capacitive sensing frame rate of the first mode of operation.

In a second example, a processing system is further configured to drive a second source line with display data to update a pixel in the display during a third period of time, wherein the second prior of time is between the first and third time period.

In a third example, a processing system, while in the second mode of operation, is further configured to drive at least one of the plurality of sensor electrodes during the non-display update period between portions of a single display update frame.

In a fourth example, the processing system, during the display update period and while in the second mode of operation, is further configured to insert the synchronizing delay after driving all of the source lines with display data.

In a fifth example, the processing system, during the display update period and while in the second mode of operation, is further configured to insert the synchronizing delay prior to driving a second source line with display data within a single display update cycle.

In a sixth example, the processing system, while in the second mode of operation, is further configured to drive a source line with line refresh data in response to a complete set of line refresh data being available in a buffer, and insert a synchronization delay in response to a complete set of line refresh data not being available in the buffer.

In a seventh example, the processing system, during the display update period and while in the second mode of operation, is further configured to drive a first source line with display data during a first period of time, drive a second source line with display data during a second period of time, drive the second source line with synchronization delay during a third period of time, wherein a length of the third period of time is selected to maintain the capacitive sensing frame rate substantially constant during the first and second modes of operation, and drive at least one of the plurality of sensor electrodes during the non-display update period after the second time period and between portions of a single display update frame.

In an eighth example, the processing system is further configured to drive the plurality of sensor electrodes during display update periods to refresh the display device and during non-display update periods for capacitive sensing.

In a ninth example, a display device includes a plurality of source drivers and gate drivers configured to drive the sensor electrodes for capacitive sensing, and a touch controller coupled to each source driver through a at least one wire, the touch controller configured to communicate display and touch data through the at least one wire.

During the synchronizing delay, the gate line is not advanced to move to the next line of the panel of the display device 280. In some implementations, the synchronizing delay is inserted in response to no video data information coming into the synchronization module 254, and/or in response to there not being a complete set of line refresh data present in the buffer block 308 or the data in the buffer block 308 fell below a predefined threshold. In one embodiment, during the synchronizing delay lines, touch sensing does not occur. Further, in other embodiments, during the synchronizing delay lines, the display line may be driven by the source drivers 252 with the previous video data information, next video data information, or optionally left to be high-Z/idle (i.e., electrically floated or coupled to a high impedance), to reduce display artifacts (e.g., display line brightening or dimming due to charge loss or extended settling times). Further, in some embodiments, during the synchronizing delay lines, neither the display electrodes are driven for display update nor the sensor electrodes are driven for capacitive sensing. Further, in some embodiments, during the synchronizing delay lines, the source drivers 252 may be driven with a ground voltage, a rail voltage or any other voltage.

Figure 7:
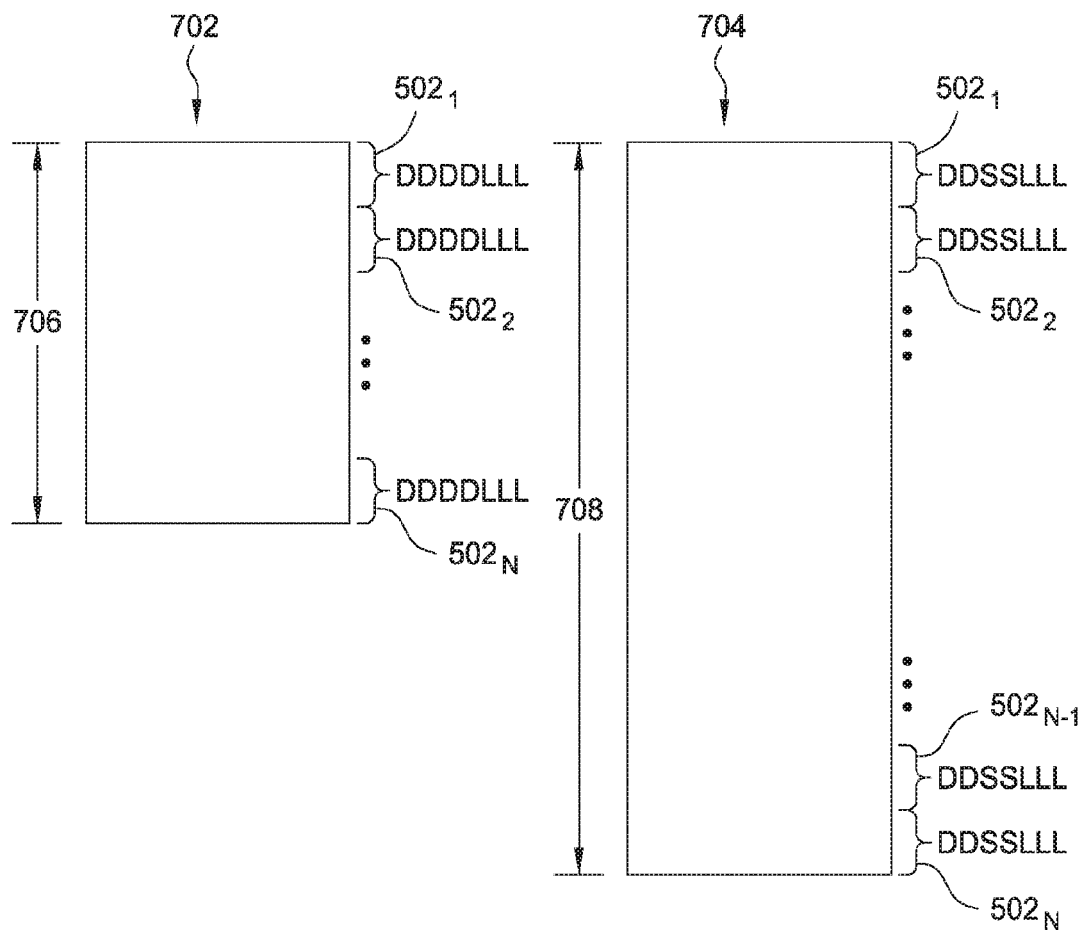
FIG. 7 is a timing comparison of an input device operating at different display refresh rates while having substantially similar capacitive sensing frame reports rates.

FIG. 7 is a timing comparison of an input device operating at different display refresh rates that illustrates the effect of synchronizing delays to maintain substantially similar capacitive sensing frame rates. Timing diagram 702 illustrates the input device 100 operating in the first mode of operation. As discussed above, in the first mode of operation the display device 280 is updated at a first display refresh rate over a first display update period 706, while capacitive sensing is performed at a first capacitive sensing frame rate. Timing diagram 704 illustrates the input device 100 operating in the second mode of operation. As discussed above, in the second mode of operation the display device 280 is updated at a second display refresh rate over a second display update period 708 that is different than the first display while capacitive sensing is performed at a second capacitive sensing frame rate. In the example of FIG. 7, the second display refresh rate is slower than the first display refresh rate, for example 30 Hz as compared to 60 Hz. At a display refresh rate of 30 Hz, the display frame time is twice as long as a display refresh rate of 60 Hz.

Since the input device 100 operating in the second mode has a longer second display update period 708, the second capacitive sensing frame rate would decrease if not adjusted. In the embodiment depicted in FIG. 7, the synchronization module 254 slows down the input line rate by inserting one or more synchronization delay lines in each scheduling window 502 to space the line update events while allowing the sensing events to be maintained at a constant rate. The synchronization delay lines are indicated by reference numeral 730, the display line update events are indicated by reference numeral 750, while the sensing events are indicated by reference numeral 740. The number and duration of the synchronization delay lines are selected to maintain the first and second capacitive sensing frame rates substantially equal over at least half the display update periods while the input device 100 is operating in the first and second modes.

Conversely, it is contemplated that the second display refresh rate may alternatively be faster than the first display refresh rate. When the second display refresh rate is faster than the first display refresh rate, the synchronization delays may be shortened or eliminated to maintain the first and second capacitive sensing frame rates substantially equal over at least half the display update periods while the input device 100 is operating in the first and second modes.

In some embodiments, the sequential position, number and/or duration of the synchronization delay lines may be predetermined, for example, using an algorithm or look-up able to insert one or more synchronization delays in each scheduling window 502. In other embodiments, the synchronization delay line is inserted in response to a complete set of input data not being available for updating the next line of the display (e.g., a buffer underflow).

Figure 8:
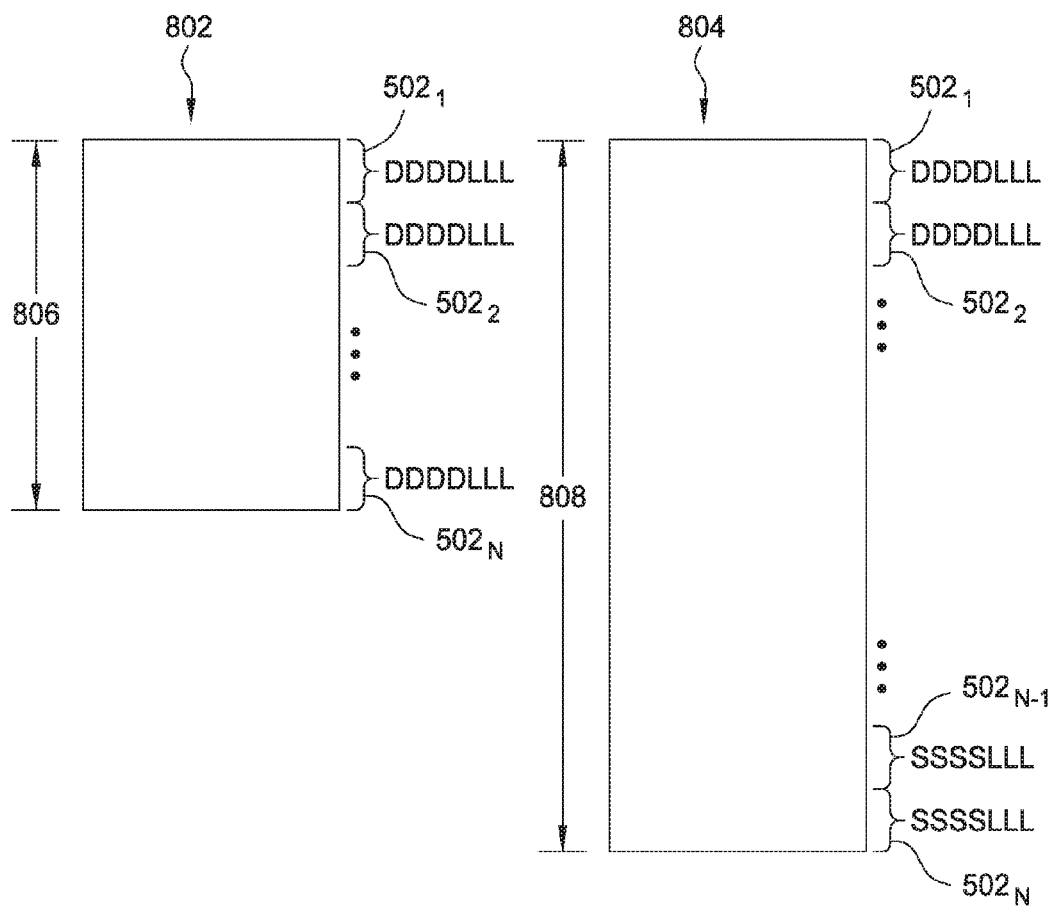
FIG. 8 is another timing comparison of an input device operating at different display refresh rates while having substantially similar capacitive sensing frame reports rates.

FIG. 8 is another timing comparison of an input device operating at different display refresh rates that illustrates the effect of synchronizing delay(s) to maintain substantially similar capacitive sensing frame rates. Timing diagram 802 illustrates the input device 100 operating in the first mode of operation. As discussed above, in the first mode of operation the display device 280 is updated at a first display refresh rate over a first display update period 806, while capacitive sensing is performed at a first capacitive sensing frame rate. Timing diagram 804 illustrates the input device 100 operating in the second mode of operation. As discussed above, in the second mode of operation the display device 280 is updated at a second display refresh rate over a second display update period 808 that is different than the first display while capacitive sensing is performed at a second capacitive sensing frame rate. In the example of FIG. 8, the second display refresh rate is slower than the first display refresh rate, for example 30 Hz as compared to 60 Hz.

In the embodiment depicted in FIG. 8, the synchronization module 254 maintains the sensing events at a constant rate by inserting one or more synchronization delay lines, indicated by reference numeral 830 within a vertical blanking period 810, i.e., after the last line update event, indicated by reference numeral 850, is performed for the display period 408. The sensing events, indicated by reference numeral 840, continue to occur during the vertical blanking period 810 while being separated by synchronization delay lines 830 such that the second capacitive sensing frame rate is maintained substantially equal to the first capacitive sensing frame rate over at least half the display update periods 406 while the input device 100 is operating in the first and second modes. In other embodiments the display lines and the sensing lines may at least partially overlap, while synchronization lines are inserted to maintain constant capacitive sensing frame rates with constant display line periods at variable refresh rates or to maintain constant capacitive sensing frame rates with variable line periods at constant refresh rates.

Thus, the embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

We claim:

1. An input device comprising:
a plurality of sensor electrodes;
a display device comprising a plurality of source lines integrated with the plurality of sensor electrodes; and a processing system operatively coupled to the plurality of sensor electrodes and to the display device, the processing system configured to:

operate in a first mode to update the display device at a first display refresh rate and drive the sensor electrodes for capacitive sensing at a first capacitive sensing frame rate during a first display frame, wherein the first capacitive sensing frame rate is greater than the first display refresh rate; and operate in a second mode to update the display device at a second display refresh rate and drive the sensor electrodes for capacitive sensing at a second capacitive sensing frame rate during a second display frame, wherein the second capacitive sensing frame rate is greater than the second display refresh rate, wherein the first display refresh rate and the second display refresh rate differ by a first amount, wherein the first capacitive sensing frame rate and the second capacitive sensing frame rate differ by a second amount, wherein the second amount is less than the first amount.

2. The input device of claim 1, wherein the processing system, while in the second mode of operation, is further configured to:

drive a first source line of the plurality of source lines with display data during a first display update interval; and drive at least one of the plurality of sensor electrodes for capacitive sensing during a long horizontal blanking period, wherein the long horizontal period comprises at least one synchronizing delay period.

3. The input device of claim 2, wherein the processing system, while in the second mode of operation, is further configured to:

drive a second source line of the plurality of source lines with display data during a second display update interval, wherein a touch sensing interval is between the first display update interval and a second display update interval.

4. The input device of claim 2, wherein the processing system, while in the second mode of operation, is further configured to:

drive at least one of the plurality of sensor electrodes during a non-display update interval between portions of a single display update frame.

5. The input device of claim 2, wherein the processing system, during a second display update interval and while in the second mode of operation, is further configured to:

insert the at least one synchronizing delay period after driving all source lines of the plurality of source lines with display data.

6. The input device of claim 2, wherein the processing system, during a second display update interval and while in the second mode of operation, is further configured to:

insert the at least one synchronizing delay period prior to driving a second source line of the plurality of source lines with display data within a single display update cycle.

7. The input device of claim 2, wherein the processing system, while in the second mode of operation, is further configured to:

drive a source line of the plurality of source lines with line refresh data in response to a complete set of line refresh data being available in a buffer; and insert a synchronization delay in response to a complete set of line refresh data not being available in the buffer.

8. The input device of claim 2, wherein the processing system, during a display update period and while in the second mode of operation, is further configured to:

drive the first source line of the plurality of source lines with display data during the first display update interval;

drive a second source line of the plurality of source lines with display data during a second display update interval;

drive the second source line with a synchronization delay, wherein a length of time that the second source line is driven with synchronization delay is selected to maintain the capacitive sensing frame rate substantially constant during the first and second modes of operation; and drive at least one of the plurality of sensor electrodes during a non-display update interval after the second display update interval and between portions of a single display update frame.

9. The input device of claim 1, wherein the processing system is further configured to:

drive the plurality of sensor electrodes during display update intervals to refresh the display device and during non-display update intervals for capacitive sensing.

10. The input device of claim 1, wherein the display device comprises:

a plurality of source drivers configured to drive the sensor electrodes for capacitive sensing; and a touch controller coupled to each source driver through a single wire, the touch controller configured to communicate display and touch data through the wire.

11. The input device of claim 1, wherein the plurality of sensor electrodes are arranged in a matrix array.

12. The input device of claim 1, wherein, the processing system, while operating in the first mode, is further configured to drive the sensor electrodes for capacitive sensing during long horizontal blanking periods.

13. The input device of claim 1, wherein the second amount is fraction of the first amount.

14. The input device of claim 1, wherein the second amount is approximately zero.

15. A processing system comprising:

a sensor module configured to operate a plurality of sensor electrodes during a non-display update period for capacitive sensing, the sensor module having sensor circuitry configured to:

in a first mode of operation, update a display device comprising a plurality of source lines at a first display refresh rate with a first capacitive sensing frame report rate during a first display update period; and in a second mode of operation, update the display device at a second display refresh rate with a second capacitive sensing frame report rate during a second display update period, wherein the first display refresh rate and the second display refresh rate are different and wherein the first capacitive sensing frame report rate and the second capacitive sensing frame report rate are about equal for at least half of the first and second display update periods.

16. The processing system of claim 15, wherein the sensor circuitry, while in the second mode of operation, is further configured to:

drive a first source line of the plurality of source lines with display data during the first display update period;

drive at least one of the plurality of sensor electrodes during a touch sensing period; and insert a synchronizing delay between the first display update period and the touch sensing period, a length of the synchronizing delay selected to maintain capacitive sensing frame report rate substantially constant relative to the capacitive sensing frame report rate of the first mode of operation.

17. The processing system of claim 16, wherein the sensor circuitry, while in the second mode of operation, is further configured to:

drive a second source line of the plurality of source lines with display data during the second display update period, wherein the touch sensing period is between the first display update period and the second display update period.

18. The processing system of claim 15, wherein the sensor circuitry, while in the second mode of operation, is further configured to:

drive at least one of the plurality of sensor electrodes during the non-display update period between portions of a single display update frame.

19. The processing system of claim 15, wherein the sensor circuitry, while in the second mode of operation, is further configured to:

drive a source line of the plurality of source lines with the line refresh data in response to a complete set of line refresh data being available in a buffer; and insert a synchronization delay in response to a complete set of line refresh data being not available in the buffer.

20. The processing system of claim 15, wherein the sensor circuitry, during the second display update period and while in the second mode of operation, is further configured to:

drive a first source line of the plurality of source lines with display data during the first display update period;

drive a second source line of the plurality of source lines with display data during the second display update period;

drive the second source line with a synchronization delay, wherein a length of the synchronization delay is selected to maintain the capacitive sensing frame rate substantially constant during the first and second modes of operation; and drive at least one of the plurality of sensor electrodes during the non-display update period after the second display update period and between portions of a single display update frame.

21. The processing system of claim 15, wherein the sensor circuitry, during the second display update period and while in the second mode of operation, is further configured to:

insert a synchronizing delay prior to driving a second source line of the plurality of source lines with display data within a single display update cycle.

22. The processing system of claim 15, wherein the sensor circuitry, during the second display update period and while in the second mode of operation, is further configured to:

insert a synchronizing delay after driving all source lines of the plurality of source lines with display data.

23. The processing system of claim 15, wherein the sensor circuitry is further configured to:

drive the plurality of sensor electrodes during display update periods to refresh the display device and during non-display update periods for capacitive sensing.

24. The processing system of claim 15, wherein the sensor circuitry further comprises:

a plurality of source drivers configured to drive the sensor electrodes for capacitive sensing; and a touch controller coupled to each source driver through a single wire, the touch controller configured to communicate display and touch data through the wire.

25. The processing system of claim 15, wherein the sensor circuitry, during a synchronizing delay, is further configured to:

not update the display device.

26. The processing system of claim 15 wherein the sensor circuitry, during synchronizing delay, is further configured to:

update the display device with display data from a buffer previously driven onto the sensor electrodes.

27. A method for operating an input device, the method comprising:

operating a plurality of sensor electrodes during a non-display update period for capacitive sensing;

in a first mode of operation, updating a display device comprising a plurality of source lines at a first display refresh rate with a first capacitive sensing frame rate during a first display update period; and in a second mode of operation, updating the display device at a second display refresh rate with a second capacitive sensing frame rate during a second display update period, wherein the first display refresh rate and the second display refresh rate are different and wherein the first capacitive sensing frame rate and the second capacitive sensing frame rate are about equal for at least half of the first and second display update periods.

28. The method of claim 27, further comprising:

driving a first source line of the plurality of source lines with display data during the first display update period;

driving at least one of the plurality of sensor electrodes during a touch sensing period; and inserting a synchronizing delay between the first display update period and the touch sensing period, a length of the synchronizing delay selected to maintain a capacitive sensing frame rate substantially constant relative to a capacitive sensing frame rate of the first mode of operation.

* * * * *

UNITED STATES PATENT AND TRADEMARK OFFICE
CERTIFICATE OF CORRECTION

PATENT NO. : 10,275,070 B2
APPLICATION NO. : 14/987558
DATED : April 30, 2019
INVENTOR(S) : Chih-Hong Fu and Joseph Kurth Reynolds It is certified that error appears in the above-identified patent and that said Letters Patent is hereby corrected as shown below:

In the Claims

In Column 25, Line 31, Claim 2, after "horizontal" insert -- blanking --.

In Column 25, Line 39, Claim 3, delete "a" and insert -- the --.

In Column 25, Line 66, Claim 7, delete "a" and insert -- the --.

In Column 26, Line 12, Claim 8, after "driven with" insert -- the --.

In Column 26, Line 13, Claim 8, after "the" insert -- first and second --.

In Column 26, Line 13, Claim 8, delete "rate" insert -- rates --.

In Column 26, Line 31, Claim 10, after "driver" insert -- of the plurality of source drivers --.

In Column 26, Line 33, Claim 10, after "the" insert -- single --.

In Column 26, Line 41, Claim 13, after "is" insert -- a --.

In Column 26, Line 52, Claim 15, after "frame" delete "report".

In Column 26, Line 56, Claim 15, after "frame" delete "report".

In Column 26, Line 60, Claim 15, after "frame" delete "report".

In Column 26, Line 61, Claim 15, after "frame" delete "report".

In Column 27, Line 5, Claim 16, after "maintain" insert -- the second --.

Signed and Sealed this
Fifth Day of January, 2021

Andrei Iancu
*Director of the United States Patent and Trademark Office*

CERTIFICATE OF CORRECTION (continued)
U.S. Pat. No. 10,275,070 B2

In Column 27, Line 6, Claim 16, after "frame" delete "report".

In Column 27, Line 7, Claim 16, after "to the" insert -- first --.

In Column 27, Lines 7 and 8, Claim 16, after "frame" delete "report of the first mode of operation".

In Column 27, Line 27, Claim 19, after "with" delete "the".

In Column 27, Line 30, Claim 19, after "response to" delete "a" insert -- the --.

In Column 27, Line 42, Claim 20, after "maintain" insert -- first and second --.

In Column 27, Line 42, Claim 20, delete "rate" insert -- rates --.

In Column 28, Line 16, Claim 24, after "through the" insert -- single --.

In Column 28, Line 50, Claim 28, after "maintain" delete "a" insert -- the second --.

In Column 28, Line 52, Claim 28, before "capacitive" delete "a" insert -- the first --.